United States Patent
Doumanidis et al.

(10) Patent No.: US 6,450,393 B1
(45) Date of Patent: Sep. 17, 2002

(54) MULTIPLE-MATERIAL PROTOTYPING BY ULTRASONIC ADHESION

(75) Inventors: Charalabos Doumanidis, Somerville; Norbert Johnson, Methuen, both of MA (US)

(73) Assignee: Trustees of Tufts College, Medford, MA (US)

( * ) Notice: Subject to any disclaimer, the term of this patent is extended or adjusted under 35 U.S.C. 154(b) by 26 days.

(21) Appl. No.: 09/753,070

(22) Filed: Jan. 2, 2001

Related U.S. Application Data

(63) Continuation of application No. PCT/US99/14858, filed on Jun. 30, 1999.
(60) Provisional application No. 60/091,268, filed on Jun. 30, 1998.

(51) Int. Cl.⁷ .......................... D23K 1/06; B23K 20/10
(52) U.S. Cl. ................. 228/110.1; 228/160; 156/264; 156/73.1
(58) Field of Search .................. 228/110.1, 155, 228/160, 225, 227, 228; 156/264, 73.1, 73.4

(56) References Cited

U.S. PATENT DOCUMENTS

| | | | |
|---|---|---|---|
| 4,439,916 A | 4/1984 | Faber | 29/623.4 |
| 5,015,312 A | 5/1991 | Kinzie | 156/63 |
| 5,274,839 A | * 12/1993 | Kularajah et al. | 333/113 |

(List continued on next page.)

FOREIGN PATENT DOCUMENTS

| | | |
|---|---|---|
| DE | 4135971 A1 | 5/1993 |
| DE | 4428938 A1 | 3/1996 |

(List continued on next page.)

OTHER PUBLICATIONS

Johnson, N., "Rapid Prototyping using Ultrasonic Metal Welding." Unpublished master's thesis, Cataloged at Tisch Library on Dec. 11, 1998, Tufts University, Medford, MA (1998).

(List continued on next page.)

*Primary Examiner*—Tom Dunn
*Assistant Examiner*—Colleen P. Cooke
(74) *Attorney, Agent, or Firm*—Hamilton, Brook, Smith & Reynolds, PC

(57) ABSTRACT

A method and apparatus for producing a three-dimensional part from a plurality of planar layers using an ultrasonic welder. A sheet of planar material is placed on the partial part and ultrasonically welded, with the first sheet placed on a base. The sheet is cut to the shape of the partial part. The process of placing of the sheet materials on the partial, welding, and cutting of the two-dimensional contour layer is continued until part is complete. In a preferred embodiment, the three-dimensional part has layers of different material. The materials can be layers of incompatible materials for ultrasonic welding in which voids are created through interposed non-compatible materials for ultrasonic welding, to allow ultrasonic welding of compatible material layers spaced by a sheet of incompatible material. In a preferred embodiment a component, such as a thermal actuator; a optical component; an internal sensor; a plurality of electronic elements, or a mechanical actuator for creating a actively deformable part, is introduced between layers of material of the part. The method described allows the introduction of components which are sensitive to manufacturing temperatures. A pressure mask applies pressure to the top layer as the layer is ultrasonic welded to the part. In a preferred embodiment, the elongated sheets of material are carried on a supply drum and moved over the partial part using a feed system having the supply drum and a take-up drum.

24 Claims, 20 Drawing Sheets

U.S. PATENT DOCUMENTS

| | | | | |
|---|---|---|---|---|
| 5,354,414 A | | 10/1994 | Feygin | 156/630 |
| 5,529,471 A | * | 6/1996 | Khoshevis | 425/112 |
| 5,555,481 A | * | 9/1996 | Rock et al. | 29/239 |
| 5,637,175 A | * | 6/1997 | Feygin et al. | 156/256 |
| 5,768,134 A | * | 6/1998 | Swaelens et al. | 433/201.1 |
| 5,876,550 A | * | 3/1999 | Feygin et al. | 156/256 |
| 5,954,909 A | * | 9/1999 | Davidsohn et al. | 156/177 |
| 6,143,378 A | * | 11/2000 | Harwell et al. | 427/264 |

FOREIGN PATENT DOCUMENTS

| | | | |
|---|---|---|---|
| EP | 0 523 981 A1 | | 1/1993 |
| EP | 0529816 A1 | * | 3/1993 |
| EP | 0 775 550 A1 | | 5/1997 |
| JP | 01045008 | | 2/1989 |

OTHER PUBLICATIONS

Doumanidis, H., "Intelligent Rapid Prototyping Technologies with Automotive Applications," (Final Report to the Honda Initiation Grant Program). Tufts University, Medford, MA (Jul. 1998).

Doumanidis, H., "Intelligent Layered Automotive Components by Ultrasonic and Laser Rapid Prototyping," (A Research Continuation Proposal to the Honda Initiation Grant Program). Tufts University, Medford, MA (Oct. 1998).

Hardjadinata, G., et al., "Intelligent Laser and Ultrasonic Technologies for Rapid Prototyping with Automotive Applications." Proceeding of the First Honda Initiation Grant Symposium, (May 20, 1999).

* cited by examiner

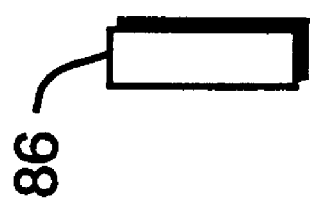
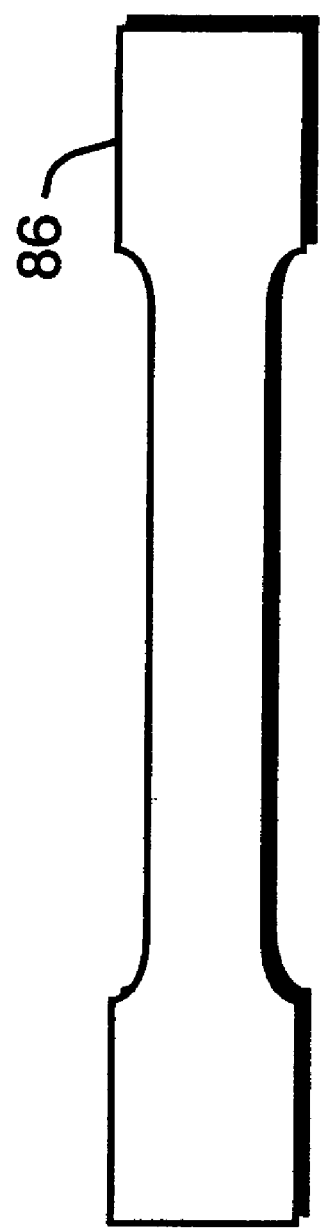
FIG. 5B
FIG. 5A

FIG. 15A
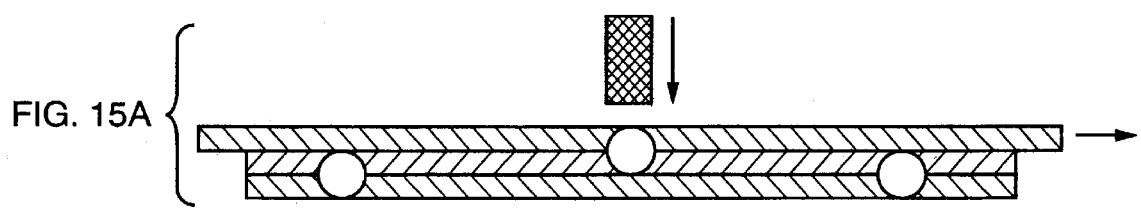
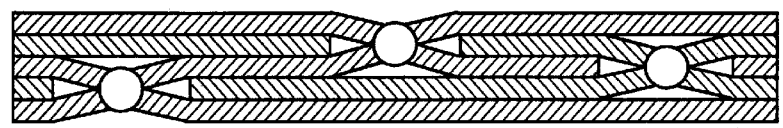
FIG. 15B

MULTIPLE-MATERIAL PROTOTYPING BY ULTRASONIC ADHESION

RELATED APPLICATIONS

This application is a continuation of International Application No. PCT/US99/14858, which designated the United States and was filed on Jun. 30, 1999, published in English, which claims the benefit of U.S. Provisional Application No. 60/091,268, filed on Jun. 30, 1998, the entire teachings of which are incorporated herein by reference in their entirety.

GOVERNMENT SUPPORT

The invention was supported, in whole or in part, by a grant DMI 9553038 from the National Science Foundation. The Government has certain rights in the invention.

BACKGROUND OF THE INVENTION

In the area of automation for design and development of new products, Rapid Prototyping (RP) methods, also referred to as Desktop Manufacturing or Solid Freeform Fabrication (SFF) techniques, is a well known technique. RP methods produce a physical three-dimensional (3-D) model by representing the 3-D geometry of the part, depositing properly contoured material in two-dimensional (2-D) layers, and bonding each layer together. The 3-D geometry is collected by designing the part using a CAD system or imported from a 3-D scanner using Laser/optical vision or other technology. The collected 3-D geometry is converted into a triangular surface representation ideal for slicing the part into 2-D layers. A computer-controlled device acts on a material in a two-dimensional contour to create a current layer and the layer is assimilated with the previous layers, as described below, to produce a three-dimensional model or part.

There are numerous methods or techniques of Rapid Prototyping. Some of these techniques are Stereolithography, Solid Ground Curing, Laminated Object Manufacturing (LOM), Fused Deposition Modeling, Selective Laser Sintering (SLS), 3D Printing, Drop on Demand Jet, Ballistic Particle Manufacturing, Shape Deposition Manufacturing (SDM), and Scan Welding Deposition.

In Stereolithography, the free surface of a molten photopolymer is selectively cured by a scanning ultraviolet (UV) light source. As the UV light source completes curing a layer, the light source is directed to create an adjacent layer which is bonded to the previous layer until a three-dimensional model is created.

In Laminated Object Manufacturing (LOM), blanks of plastic or paper sections are sliced out of sheet material by a laser beam. The slices of the sheets are bonded thermally to form a three-dimensional physical model.

In Selective Laser Sintering (SLS), thin layers of a polymer, ceramic or metal powder mixed with a bonding agent are locally sintered by a focused laser beam. The layers are built-up to form the three-dimensional physical model.

In 3D Printing and Drop on Demand Jet, a print head is used to form the three-dimensional object. In 3D Printing, thin layers of material powder are ejected from the print head with an adhesive binder to form the model. In Drop on Demand Jet, the printing head nozzle ejects droplets of a polymer and/or supporting wax, to deposit very thin layers of material.

In Scan Welding Deposition, metal layers are deposed in adjacent meandering beads by cold wire feeding in the molten puddle using plasma-arc or laser welding. The layers are welded on top of the previously laid sections until the three-dimensional model is formed.

Depending on the dimensional tolerance to the actual product and the RP method used, the completed prototype can be used for one or more purposes. These purposes include the visualization of the final part geometry and validation of its form, fit, and function. The model can in certain cases be used as a test model of the product, possibly at a convenient scale, in experimental evaluation of its performance properties (e.g. drag and lift coefficients in a wind tunnel).

The prototype sometimes can also be used as an indirect model for the development of permanent or single-use molds or dies, for production of the actual product by injection molding, evaporative pattern or investment casting, spray-metal tooling, room-temperature vulcanization (RTV) etc. These processes then duplicate the part shape, usually by a different material, in mass production.

One other purpose is to use the prototype directly as a real functional part, when the dimensional tolerances, surface finish, material structure and properties meet the part's design specification. This is ideal for low-volume production of custom-made or one-of-a-kind products or replacement parts.

SUMMARY OF THE INVENTION

While current Rapid Prototyping (RP) methods answer several manufacturing and design needs, it has been recognized that these methods have several shortcomings. These shortcomings include that 1) parts can only be produced from a single uniform type of material, 2) the materials used are generally expensive and lack desired mechanical properties and 3) those models produced of metal generally lack both the strength and the required dimensional tolerances needed for direct tooling, die, and other real functional metal product applications.

This invention relates to a method and apparatus for producing a three-dimensional part from a plurality of planar layers. A sheet of planar material is placed on the partial part and ultrasonically welded, with the first sheet placed on a base. The sheet is cut to the shape of the partial part. The process of placing of the sheet materials on the partial, welding, and cutting of the two-dimensional contour layer is continued until part is complete.

In a preferred embodiment, the three-dimensional part has layers of different material. The materials can be layers of incompatible materials for ultrasonic welding in which voids are created through interposed non-compatible materials for ultrasonic welding, to allow ultrasonic welding of compatible material layers spaced by a sheet of incompatible material.

In a preferred embodiment a component, such as a thermal actuator; a optical component; an internal sensor; a plurality of electronic elements, or a mechanical actuator for creating a actively deformable part, is introduced between layers of material of the part. The method described allows the introduction of components which are sensitive to manufacturing temperatures. A pressure mask applies pressure to the top layer as the layer is ultrasonic welded to the part. In a preferred embodiment, the elongated sheets of material are carried on a supply drum and moved over the partial part using a feed system having the supply drum and a take-up drum.

The invention relates to a method and an apparatus to prototype cost effective parts with advanced and customized properties. These prototypes include full dense, full-strength metal and plastic functional parts; multiple-metal, multiple-plastic, and metal-plastic sandwich parts with internal pattern structures; composite materials with fiber reinforcements; active materials with embedded mechanical, thermal and optical fiber actuators; intelligent materials with encapsulated miniature sensors, electronics, processing and control elements; and with micro-hydraulic channels, fluidic networks, micro-mechanisms and mechacronics internal arrangements.

In a preferred embodiment, the three-dimensional geometry of a part is described as either a Stereolithography (STL) file or other standard CAD file format (IGES, DXF, etc.). This desired geometry is then sliced into a stack of 2-D section contours by software. In the subsequent hardware construction, each layer is produced out of thin sheet material. An ultrasonic welding device spot or seam welds the layer of material in place. After the welding of each layer or section has been completed, a high-speed cutter shapes the layer or section to the desired 2-D contour. Each remaining layer as well as possible embedded components, is deposited in the same manner until the entire part is complete.

In a preferred embodiment, the cutter is either a carbide or diamond tip scriber, or a rotary end-mill tool, but can also employ electrical discharge machining (EDM), abrasive water jet cutting (AWJC), laser, plasma-arc, ultrasonic or other cutting technology.

In a preferred embodiment, a control unit controls the movement of the ultrasonic welder and the cutter. In addition, the control unit also controls the positioning table, supporting the constructed three-dimensional part, the embedded component supply, as well as the material sheet feeder and removal mechanisms.

The apparatus and the method of the invention can bond dissimilar metals, polymers, or combinations, which allows prototypes of sandwiched materials to be produced. By bonding the material together at low temperatures instead of melting or heating as in conventional RP technologies, such as stereolithography, LOM, SLS, drop on demand and scan welding deposition, the absence of thermal expansion, shrinkage, and warping ensures the part's dimensional accuracy. Because of the cold bonding of layers, the absence of material structure transformations preserves the original mechanical, thermal, electrical, etc. properties of its components and embedded elements. The weld arrangement when bonding the layers together can be designed to increase directionally the prototype strength, which allows the properties of the prototype to be customized or brought closer to the actual product (i.e., fully bonded sheet prototypes approach the strength of a solid part.)

In addition the method of the invention does not require special materials, thus reducing the cost of the prototypes. Most materials such as metals and polymers are available in low-cost thin sheet form. In addition the apparatus and the method of the invention is suitable for desktop manufacturing in a general environment, with no special air conditioning or other needs, due to the low energy requirements, voltage, emissions, noise, temperatures, etc. Thus hazards from radiation, electromagnetic fields and toxic fumes are avoided.

In a preferred embodiment, a three-dimensional part is made of filly dense metal, plastic or composite materials. In another preferred embodiment, embedded small components such as electronic circuitry, fiber optics, micro-sensors, actuators, processors and mechanisms can be located or developed in the three-dimensional part according to the method. This embodiment allows for prototypes with special internal structure and intelligence, designed to obtain customized micro-scale functionality.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A and 5B are front and side view of a dog-bone sample;

FIG. 15A is a sectional view of ultrasonic weld of compatible material;

FIG. 15B is a sectional view of ultrasonic weld with interposed incompatible material;

DETAILED DESCRIPTION OF THE INVENTION

Figure 1:
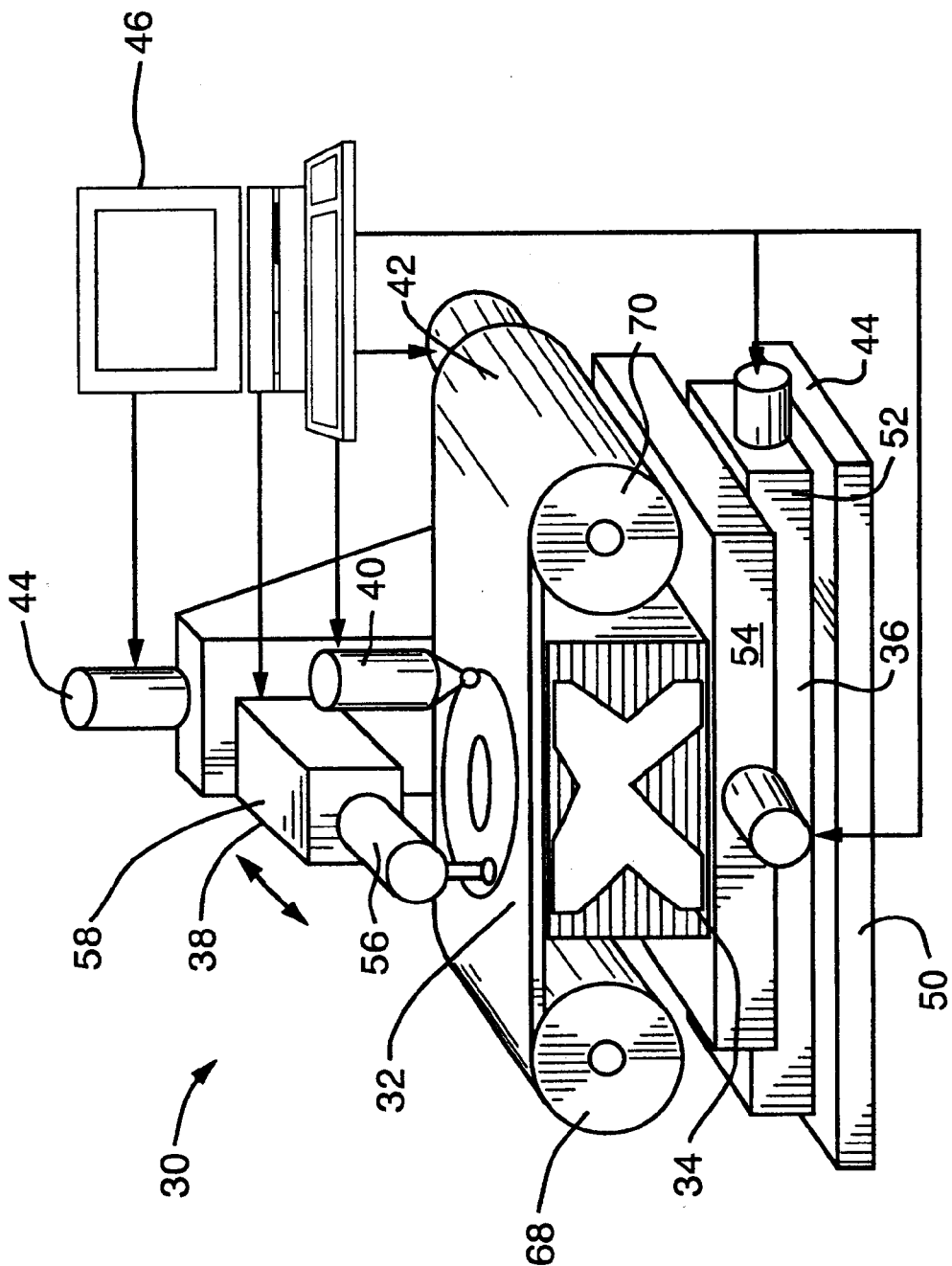
FIG. 1 illustrates an ultrasonic adhesion apparatus according to the invention.

Referring to the drawings in detail, where like numerals indicate like elements, there is illustrated an ultrasonic adhesion apparatus in accordance with the present invention, generally referred to as 30 in FIG. 1.

The ultrasonic adhesion apparatus 30 as illustrated in FIG. 1 ultrasonically welds a stack of planar sheets 32 together to build a three-dimensional part 34, as explained in greater detail below.

The ultrasonic adhesion apparatus 30 has a table 36 on which the three-dimensional part or layered prototype 34 is built, a ultrasonic welder device 38, a cutting device 40, a material moving device 42, a moving mechanism 44 and a control unit 46.

The table 36 of the ultrasonic adhesion apparatus 30 has three main components, a base 50, a Cartesian table 52 and an anvil 54. The table 52 is carried by the base 50 and is capable of moving in the x-direction relative to the base 50 and the stationary ultrasonic welding and the cutting devices 38 and 40. The anvil 54 is carried by the Cartesian table and moving in the y-direction relative to the Cartesian table 52 and the ultrasonic welding and the cutting devices 38 and 40.

Figure 2:
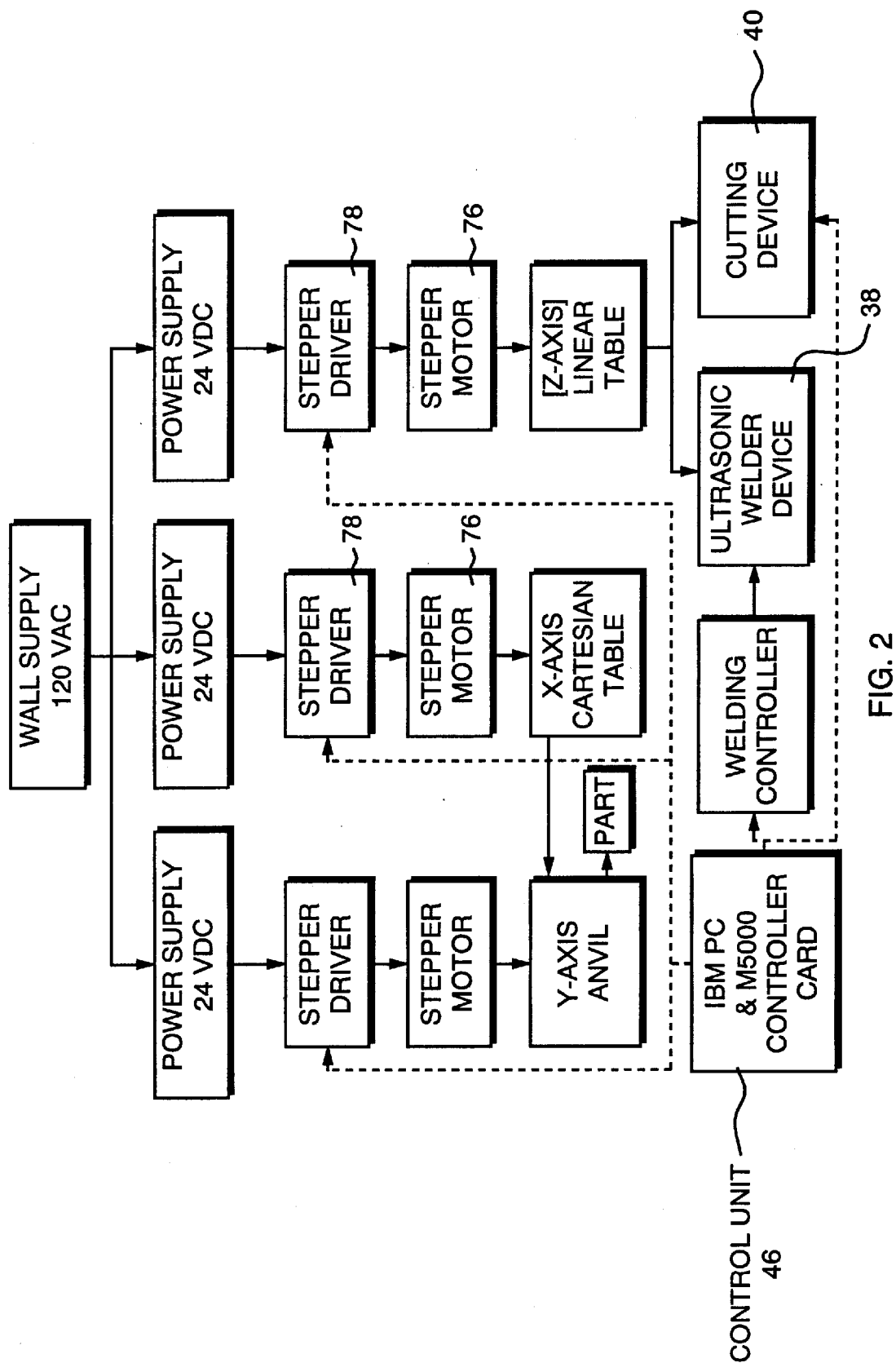
FIG. 2 is a schematic of the integration of the components of the ultrasonic adhesion apparatus.

In a preferred embodiment, the movement of the Cartesian table 52 and the anvil 54 relative to the base is done using stepper or servo motors. The movement of the motors is controlled by the control unit 46 as illustrated in FIG. 2. While the movement is described in a Cartesian coordinate system, it is recognized that other coordinate systems may be used or desired, such as a cylindrical coordinate system.

The sheets are bonded together using ultrasonic welding which is a combination of cold-press and friction welding due to its mode of action. However, the normal forces (F) required in ultrasonic vibration are about 1% of the normal forces required for cold-press welding. The ultrasonic welder device 38 of the ultrasonic adhesive apparatus 30 has three components: the ultrasonic generator, ultrasonic transducer system 56, and the ultrasonic welding frame 58.

The ultrasonic generator converts normal line current to a higher frequency wave. The ultrasonic generator, in a preferred embodiment, takes the (50/60 Hz) line frequency with amplitude of (220/110V) and converts it to a 20 kHz sinusoidal wave with adjustable amplitude. The generator automatically tunes itself to keep the output frequency and amplitude constant.

Figure 3:
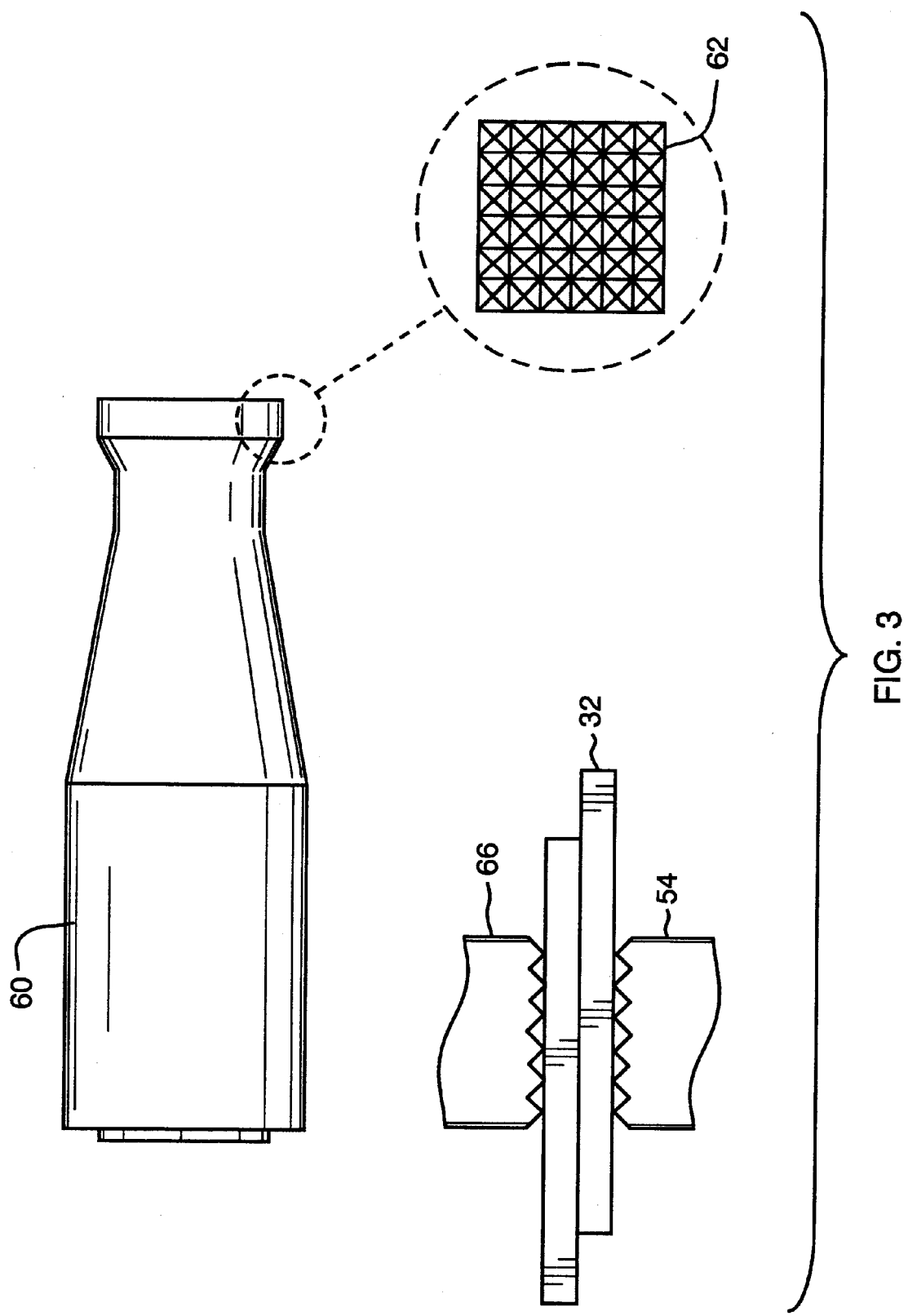
FIG. 3 is a side view of the texture tip of the sonotrode engaging the planar sheets.

The ultrasonic transducer system 56 consists of a converter, a booster, and a sonotrode 60. The converter transforms the high frequency electrical signal coming from the ultrasonic generator into mechanical vibration. The booster then takes the mechanical vibration from the converter and transforms the amplitude while not affecting the frequency. Connecting to the booster is the sonotrode. The sonotrode has a textured tip 62, as seen in FIG. 3. In a preferred embodiment, the texture tip 62 has a square footprint ring ⅛ inch×⅛inch,. It is this texturing that transfers the mechanical vibration into the planar sheets which form the three-dimensional part. The texturing grips the top layer of material and vibrates it without slipping.

The ultrasonic welding frame, of the ultrasonic welder device 38 supports the transducer system on a plurality of pneumatic actuators. The actuators produce the required normal force during the welding process. The force of the pneumatic actuators can be adjusted by activating one to four of the pneumatic cylinders and by a pressure gauge with manometer.

The ultrasonic welding frame is carried by a vertical translation stage, moved by a stepper or servo motor, in order to elevate the sonotrode as the prototype layers are accumulated on the anvil while the part is constructed.

Figure 12:
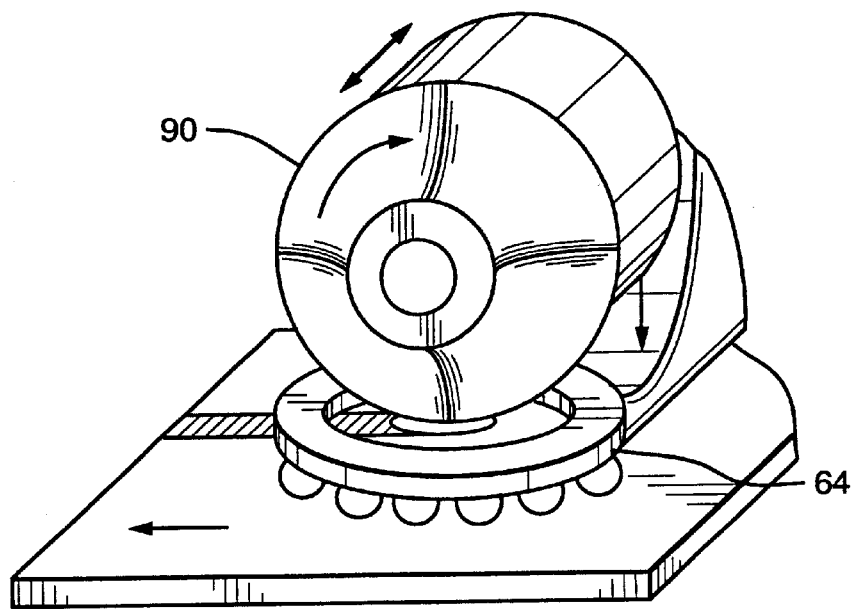
FIG. 12 is an enlarged view of FIG. 11 showing a masking fixture used with the seam ultrasonic welding device.

In a preferred embodiment, the sonotrode tip 62 the ultrasonic welder device 38 is surrounded by a round masking fixture 64 ending at an axial bearing, to compress vertically and constrain the bonded layers in place, to damp out the ultrasonic stress waves and to protect the previously made bonds from fatigue fracture, as seen in FIG. 12.

The cutting device 40 of the ultrasonic adhesion apparatus 30 cuts the top layer or planar section 32 used to construct the three-dimensional part 34, as described below.

In one preferred embodiment, a router such as sold by Dremel with an attached end-mill, is used for shaping each layer into the desired 2-D contour. The dremel is a variable speed cutter ranging from 5,000 to 30,000 RPM. The end-mill in a preferred embodiment is a ⅛ inch two-fluted end-mill designed for plunging.

The material moving device 42 of the ultrasonic adhesion apparatus 30 moves a new planar sheet 32 of material over the three-dimensional part 34 which is being created. In a preferred embodiment, the material moving device 42 is a supply/take-up foil feeding system 66. The prototype material, planar sheet 32, is fed in thin foil form from the supply onto the prototyping table 36.

Figure 16:
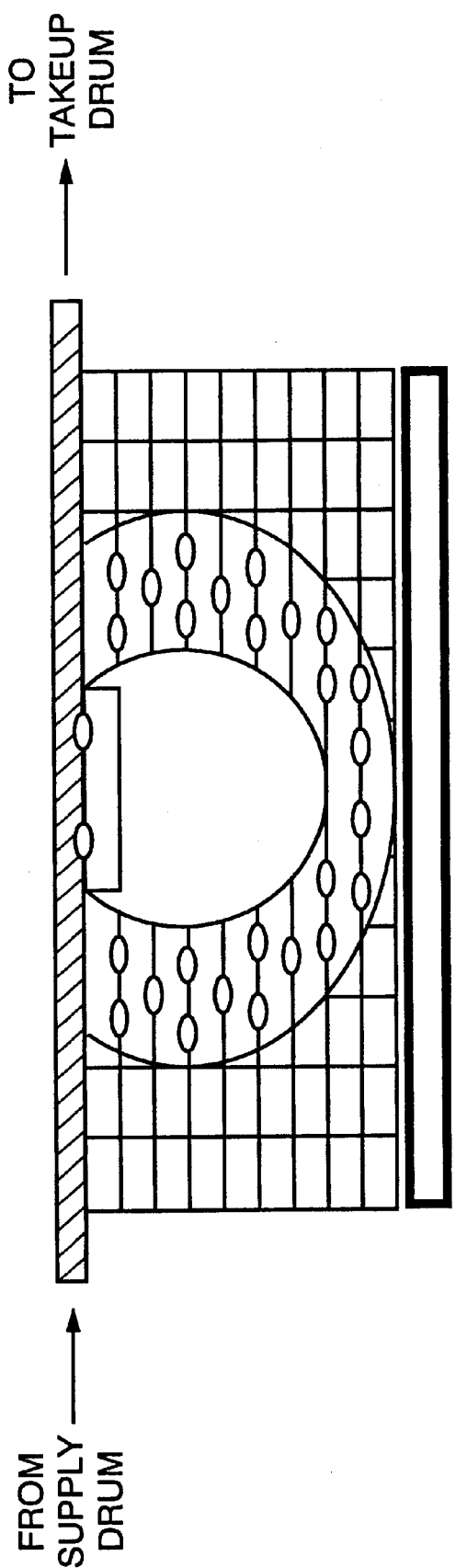
FIG. 16 is a sectional view of a part with a planar sheet welded to a section to be removed and having a crosshatched support region.

The supply/take-up feed system 66 has a pair of drums, a supply drum 68 and a take-up drum 70, as seen in FIG. 1. Each drum has a motor controlled by the control unit 46 for guiding the material. The supply/take-up feed system moves in the Z-directions in unison with the ultrasonic welder device 38 and the cutting device 40. In addition, a spring-loaded drum roll mechanism and a set of roll axial pushers accommodate passive motion of the top layer sheet together with the prototype in the X and Y directions respectively. This feeding arrangement ensures proper alignment and contact of the processed foil to the previous prototype layers, and constrains it to a flat shape for the ultrasonic welding. The new material foil section at the top of the table is ultrasonically welded to the underlying layers already deposited on the table, and it is subsequently cut to the proper section contours. After processing of each slice is completed, a fresh foil section for the next layer is moved at the top of the table. The unblanked portion of the foil surface remaining from the previous layer is recycled at the take-up roll. During the process, some unused portions of the foil sections are retained around the prototype to provide support and to assist thermal conduction. During the cutting stage, this remaining material is crosshatched by the cutting tool, to allow for this extra material to be easily detached and rejected when the completed prototype is removed from the device. However, certain other scrap portions of the foil corresponding to internal hollow regions of the part must be removed during processing in order to avoid their entrapment in the prototype. This is obtained by leaving temporary connections of these portions to the part layers and then bonding these portions to the rejected part of the fresh top layer foil that has covered them. Their removal is completed by cutting off their temporary connections, so that they can be recycled to the take-up drum with the unblanked foil, as best seen in FIG. 16.

The moving mechanism 44 of the ultrasonic adhesion apparatus 30 moves the components, i.e. the ultrasonic welder device 38, the cutting device 40 and the material moving device 42 in the Z-direction relative to the table 36, during material transport and cutting. It also retains the relative position during welding. The material moving device 42 moves in unison to the welder/cutter.

In addition, the moving mechanism 44 transports the constructed prototype in the X and Y directions under the ultrasonic welder, the cutter and material moving device. This is obtained by translating the table 52 and the anvil 54 in a Cartesian positioning arrangement, or by proper coordinated motions in another arrangement such as cylindrical. The top layer sheet follows passively the motion of the prototype in the X and Y directions.

The moving mechanism 44 has a plurality of stepper motors 76, as seen in FIG. 2, each is controlled using a stepper driver 78. The stepper motors are connected to lead screw mechanisms and slide stages to position and retain the components. In a preferred embodiment, two stepper motors and linear stages, are configured to more the Cartesian table 52 and the anvil 54 relative to the base in a Cartesian X, Y direction. The ultrasonic welder device 38, cutting device 40, and the material moving device 42 move in the Z-direction by another similar stepper mover and stage. The material moving device 42 moves in the Z-direction only. The top layer, the planar sheet 32 slides passively in the X and Y directions to follow the part. While the movement is described in a Cartesian coordinate system, it is recognized that other coordinate systems may be used or desired, such as a cylindrical coordinate system.

The positioning accuracy in the Z-direction is designed to be less than the thinnest planar sheet used in the forming of the three-dimensional part. This accuracy allows the cutting device 40 to be positioned to cut through only the top layer of material. In a preferred embodiment, to ensure productive layer deposition, the minimum planar sheet thickness is 0.001 inches. The linear table used for the Z-direction must have an accuracy of at least 0.001 inches. The positioning accuracy for the X-direction and Y-direction do not have any physical constraints, but should be as small as possible to improve the geometrical tolerances of the prototype. The stepper motors coupled with the stepper drivers give a stepping resolution of at least 400 counts per revolution. Coupled to a 0.2 inch pitch of the lead screw stages, this gives a linear positioning accuracy of 0.0005 inches per count for the linear tables.

Depending on the material of the prototype, the vertical force produced by the pneumatic mechanism of the ultrasonic metal welder must be varied. For aluminum foil with a thickness of 0.005 inches, the range of vertical forces during welding must be between 20–100 lbs. The positioning table is designed to accept a maximum vertical load of around 100 lbs.

The stepper motor and lead screw holding torque retains the ultrasonic metal welder, the cutter device, and the material movement mechanism. In a preferred embodiment, each of the positioning stages, i.e. the Cartesian table, the anvil, and the vertical are driven by a dual shaft 2.25 VDC, 4.6 Amp stepper motor stage with a holding torque of 150 oz-in. This holding torque more than satisfies the constraint of 25.4 oz-in.

In one embodiment, it was found that as the stepper motors operate around 100 counts per revolutions, a resonance is initiated which is transmitted through the stages and into the table. The result is unwanted vibration in the table that causes unsatisfactory cutting results. This problem is fixed by operating the stepper motors with micro-stepper drivers. The micro-stepper drivers are adjustable to operate between 400 to 50,000 steps per revolution. Operating at higher stepping frequencies allows the motor to stay safely above resonance.

Referring to FIG. 2, the control unit 46 of the ultrasonic adhesion apparatus 30 controls the material moving device 42, the ultrasonic welder device 38, the cutting device 40, and the moving mechanism 44 (i.e., the stepper motors). The control unit 46 operates the components in a coordinated order and manner to produce a part.

In a preferred embodiment, the control unit 46 is a personal computer, equipped with digital-to-analog converter card to control the operation of the ultrasonic welder, the cutter and the material moving mechanism, and with motion control card to operate the stepper motor drivers. The control unit 46 in a preferred embodiment runs a custom control software developed by C++.

The control unit is programmed to move the components in the quickest point-to-point movement between welds, but to follow a precise continuous path while cutting and having other path critical functions.

The control unit 46 requires input of the geometry of the desired part that is to be modeled or produced, as well as the properties of the raw material sheet.

In a preferred embodiment, the three-dimensional geometry of the part to be constructed is imported using a STL (Stereolithography) file description. The STL file represents the three-dimensional geometry in the form of triangles (facets) representing the surface of the part. It is recognized that the geometry data for the part can be gathered from other sources, such as a CAD software package, or a three-dimensional scanning device, such as a stylus or laser profilometer.

An algorithm is used to slice the three-dimensional part into two-dimensional contours. The two-dimensional contours together with the crosshatching pattern of the support material, define where the cut in the sheet material takes place. However, the control unit 46 in addition needs to determine where the ultrasonic vibration welds will occur.

The software in the control unit creates a grid pattern used to determine the welding locations. If the grid point lies inside the two-dimensional layer contour or serves for bonding the hollow region sections to the rejected portion of the foil as explained above, the point is welded; otherwise the point is skipped. Two different grid patterns were tried, one with orthogonal grid spacing, and the other with the grid spacing made from equilateral triangles. The equilateral triangles create a grid pattern where neighboring welded points are equal distances apart. After performing tensile strength tests with both patterns, it was determined that the grid pattern has very little effect on the strength of the part. However, the grid spacing between welds affects both the part effective density and mechanical properties. This spacing, as well as the sheet layer thickness, must be specified as inputs to the software, together with the part geometry file and the welding and cutting process conditions.

Figure 4:
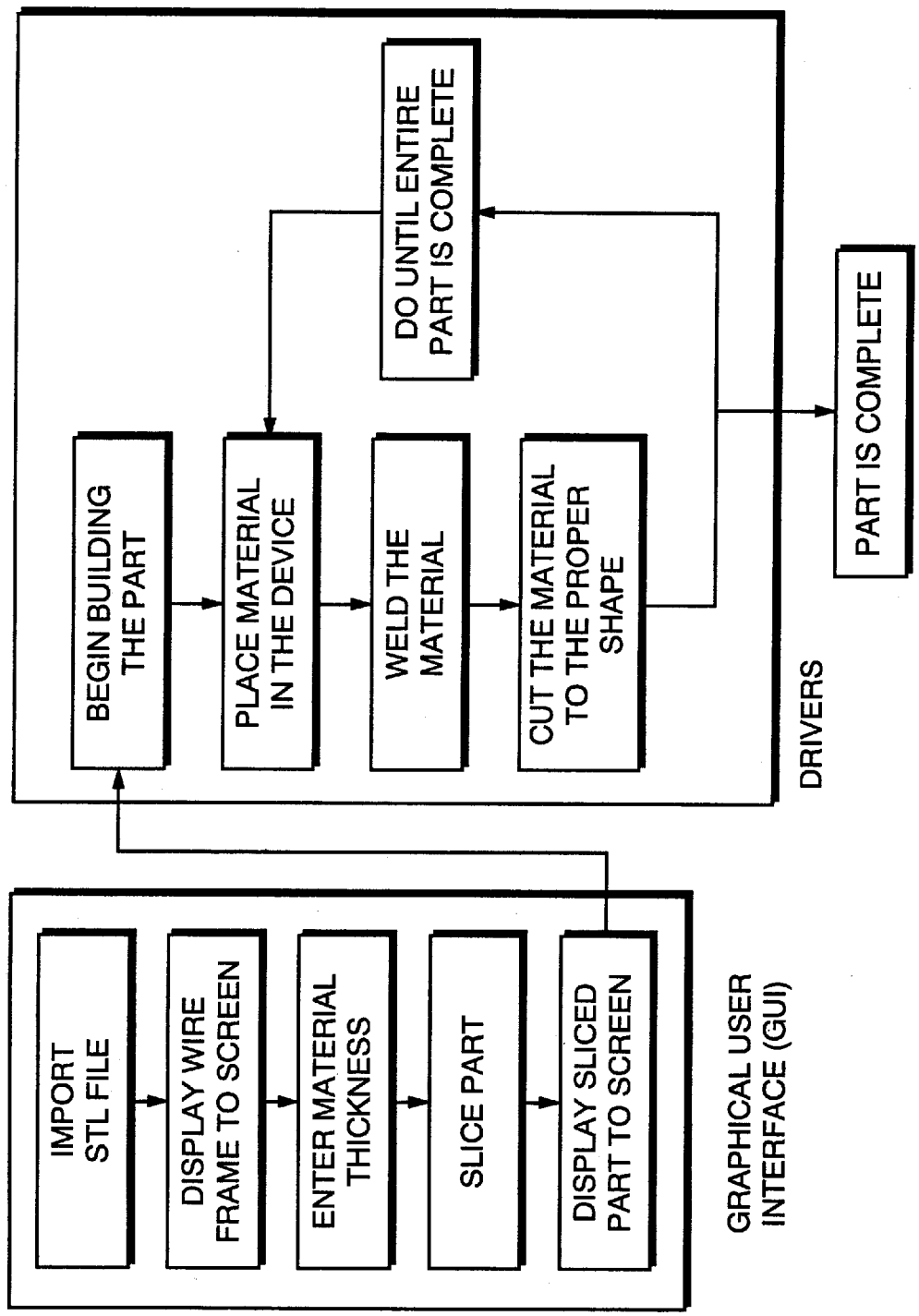
FIG. 4 is a flow chart of the rapid prototyping method with the ultrasonic adhesion apparatus.

Referring to FIG. 4, once the software inputs have been provided (i.e., the three-dimensional geometry, the sheet thickness, weld spacing, welding and cutting process condition) and the two-dimensional contours have been determined by the slicing algorithm, the three-dimensional part is ready to be produced.

A base plate 80, as best seen in FIG. 16, on which the three-dimensional part is built is bolted on the anvil 54. The supply/take-up feed system 66 is lowered to place the first planar sheet 32 on the base. With the round masking fixture 64 holding the sheet 32 against the base 80, the sheet 32 is ultrasonically welded to the base at a limited number of supporting weld locations.

When bonding using ultrasonic welding, the energy required comes from the normal force and the ultrasonic vibration. The normal force presses the top layer against the three-dimensional part or prototype being built, which are located between the sonotrode and the anvil. While the parts are being pressed together by the normal force, the textured tip of the sonotrode and the anvil grip into the respective parts to prevent slipping. With no relative motion (slipping) between the top layer and the sonotrode, and no relative motion between the prototype and the anvil, the parts will slip with respect to one another when the ultrasonic vibration of the sonotrode is applied. This ensures that the ultrasonic energy is dissipated at the interface of the top layers and the prototype, not between the part and sonotrode or anvil. The vertical compression of the masking device clamps steadily the multi-layered prototype in place, so that the generated friction between its deposited layers prevents internal slippage and failure of the existing welds by fatigue, and so that the prototype behaves like a solid part.

During ultrasonic welding, the scrubbing action or plunging between the top layer and prototype initially breaks and disperses their surface contaminates (oxides, etc.). The vibratory friction or compression between the exposed clean surfaces generates direct material bonds between their lattices, due to the mobility of the surface particles. The microbonds inhibit the slippage and increase the internal stresses and deformation of the material, while the ultrasonic generator increases the scrubbing or plunging force to maintain a constant vibration amplitude. The elastic hysteresis and plastic deformation of the material (when its yield point is exceeded) due to dislocation motion, causes heat dissipation and increases the material temperature. This results in recrystallization of the material into a fine grained, cold worked structure, with continuous common grains bridging the welded parts, yielding enlarged weld spots. These are reinforced by diffusion of components between the parts, which continues beyond termination of the ultrasonic vibration. In plastics, similar effects are generated by local viscous flow of the material.

It should be noted that during the above process, melting of the material does not take place. The temperature rise of the material is a function of the process settings, and its maximum range is between 35% and 50% of the material melting temperature. Although melting does not take place, the bond is a solid, homogeneous, lasting joint.

In ultrasonic welding there are three major and two minor process condition which determine the quality of the weld. The major process settings are vertical pressure, vibration amplitude and welding time. The minor process settings are trigger point and afterburst time intervals.

The vertical pressure is directly related to the normal force produced on the parts. It is important that the pressure be large enough to clamp the parts together so a good bond can be achieved. However, if the pressure is too large, melting instead of diffusion will occur. It is also important that the clamping pressure remain constant during welding.

The amplitude is half the total distance that the tip of the sonotrode moves in the vibration direction. Due to the importance of constant amplitude, the generator self-tunes the incoming voltage. The range of amplitudes is generally up to 100 microns. If larger adjustments are needed, the booster can be changed.

The welding time is the duration of the ultrasonic vibration. In the device, this parameter can be adjusted between 0.1 to 1 second and automatically adjusted online by quality control devices as to produce an optimum weld. For most applications, the time is reduced to the smallest value possible while still producing a good weld. If the time is too large, melting could occur.

The trigger point, a minor process setting, is the time the ultrasonic vibration starts after the vertical pressure is applied. For some applications, the parts are compressed to a given force before the ultrasonic vibration begins and in other applications the sonotrode is oscillating while the parts are being clamped together.

During an ultrasonic weld, the sonotrode can occasionally weld itself to the parts being welded. To prevent this, an afterburst of ultrasonic vibration is given to the sonotrode as the vertical presser is removed from the parts.

All of the major process settings in ultrasonic welding effect the energy given to the parts. The amount of ultrasonic energy transferred to the parts is proportional to the welding time, amplitude, and pressure. As any one of these parameters is increased, the energy is increased. If not enough energy is used, the surface contaminates will not be removed and a weak weld will be produced. If too much energy is used, the part will severely deform and weaken the bond.

In a preferred embodiment, the ultrasonic welder device does not move in the X-Y plane. The table 36 with the prototype base and the planar sheet moves to the desired weld point locations.

After the ultrasonic welding is complete, the planar sheet 32 is cut. For this purpose, the ultrasonic welder device 38 is raised by the pneumatic mechanism in the Z-direction and the cutting device is lowered. The sheet is held in position through its previous welds to the prototype during the cutting stage. Similar to welding, the cutting device 40 does not move in the X-Y plane. The table 36 with the base plate 80 and the planar sheet 32 move in a continuous path, since the path of the cutting device 40 is critical to the shaping of the part.

During this blanking step, the cutting tool also crosshatches the unused portions of the foil sections, which are retained on the process table to provide support to the prototype and to assist thermal conduction, as best seen in FIG. 16. This allows them to be easily detached and rejected when the completed prototype is removed from the device. A rectangular section of the sheet is cut out and left to surround and support the part.

After the planar sheet 32 has been welded to the base and cut, the cutting device 40 is raised in the Z-direction. The material moving device 42 is also raised above the beginning three-dimensional part, and the supply and take-up drums are rotated to remove the unused portion and any previous residual sections, and to place a new portion of the planar sheet above the three-dimensional part.

In the next cycle, the material moving device 42 is lowered, placing the planar sheet on the three-dimensional part being built. The control unit subsequently controls the lowered ultrasonic welder device to weld this layer to the part. The control unit 46 controls the cutting device to lower the cutting device into position and then move the table 36 to form the two-dimensional contour of the next layer.

The process is continued until the part is complete. At the end of the fabrication, the base is unbolted from the anvil, and the crosshatched support material is removed. Finally, the prototype is manually separated from the base by breaking off the initial supporting welds.

Tensile Specimen (Dog-bone)

A universal tensile test specimen, referred to also as a dog-bone sample 86, as seen in FIGS. 5A and 5B, was made from a plurality of planar sheets using the method described above. The dog-bone sample 86 was compared to a solid universal tensile test specimen, a dog-bone sample, of the same dimensions made from Type 1100 aluminum.

The aluminum (Type 1100) dog-bone prototype has a thickness equal to 0.045 inches. This corresponds to nine layers of 0.005 inch thickness aluminum foil sheets. These were bonded by spot welds arranged internally on a square grid, with one-quarter inch spacing between adjacent weld centers. However, the perimeter of each layer is fully welded by contiguous bonds.

The testing protocol was taken from the ASTM designation: E8-96a, Standard Test Methods for Tension Testing of Metallic Materials. The test conducted included part density, elastic torsion, elastic bending, and tensile strength.

The dog-bone sample 86 was constructed in a method described above and reiterated below. An aluminum base having the dimensions of 9"×5"×⅛" with mounting holes in each corner is bolted to the base. It is important that the base surface is free from corrosion. This can be accomplished by sanding the mounting base before securing it to the rotary table. The first layer of material is placed on the base and the interior points are welded. The spacing of the interior welding points was determined by the grid spacing parameter, as described above. The optimal welding parameters are as follows: vertical force 90 lbs, vibration amplitude 7.6 microns; welding time 0.4 sec.; and no trigger point afterburst intervals. In addition to welding the interior points of the dog-bone sample 86, perimeter points were welded. This welding of outside the part is done for one or more reasons, including to assist in supporting the part for thermal conductivity, and to assist the cutting tool in producing an accurate clean cut by preventing the material on the edge from raising up as the cutting tool passes.

The cutter then positions itself and cuts the two dimensional contour out of the welded layer of material. The optimal cutting conditions are as follows: rotation speed 30,000 RPM; cutting feed 1 in/sec; and depth of cut equal to a full layer thickness (0.005 in.) Once the cutter has completed shaping the two dimensional contour, the excess material is removed. The process is repeated until all the planar sheets, in this example nine layers, have been welded into place and cut to the proper two-dimensional contour.

The part density of the dog-bone sample 86 made using the above method was compared to the solid dog-bone. The part density was determined by a volumetric water displacement method, determining the part volume Vp. The part mass (mp) is measured on an accurate scale and the density is calculated by dp=mp/Vp. This technique was performed for each dog-bone. The results are seen in Table 1.

TABLE 1

| Part's density comparison | | | |
|---|---|---|---|
| Type | Volume (ml) | Mass (g) | Density (g/ml) |
| Layered | 3.800 | 8.267 | 2.176 |
| Solid | 3.400 | 8.145 | 2.396 |

The density of the layered dog-bone was 90.8% of that of the solid part.

The elastic bending stiffness of the two dog-bone samples was compared. The parts were fixed on one end in a cantilever beam arrangement, while a varying weight force was applied to the other end creating a deflection to measure elastic bending. Table 2 shows the data taken with varying weights.

TABLE 2

| Bending Test Comparison | | |
|---|---|---|
| | Deflection | |
| Moment (g-cm) | Solid | Layered |
| 69.85 | 0.794 | 0.397 |
| 139.70 | 1.984 | 1.191 |
| 279.40 | 4.763 | 2.778 |
| 698.50 | 11.509 | 8.731 |
| 1397.00 | 21.828 | 17.859 |

Figure 6:
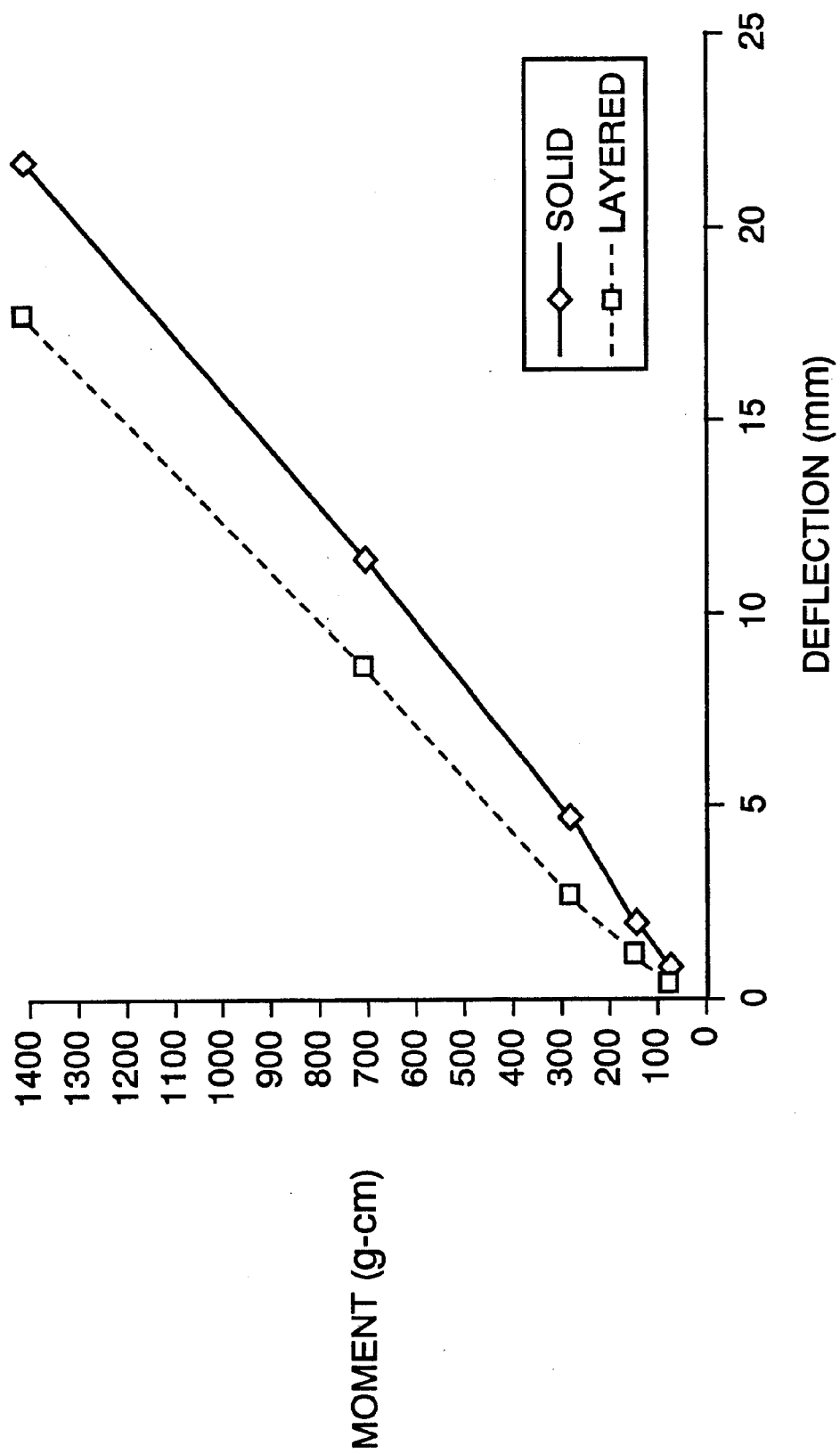
FIG. 6 shows the weight to deflection curve of each dog-bone.

FIG. 6 shows the weight to deflection curve of each dog-bone. It appears in this diagram that the layered dog-bone is 8.76% stiffer in bending than the solid part.

The elastic torsion stiffness was compared for the two dog-bone samples. To measure elastic torsion, one end of the part is fixed while the other end is twisted by a varying weight torque applied, which creates an angular deflection. Table 3 shows the data taken with varying weights.

TABLE 3

| Torsion test comparison | | |
|---|---|---|
| | Deflection | |
| Torque (g-cm) | Solid | Layered |
| 68.2625 | 2.381 | 1.984 |
| 136.525 | 4.366 | 4.366 |
| 273.05 | 7.938 | 8.334 |
| 682.625 | 20.241 | 20.638 |
| 1365.25 | 42.466 | 43.259 |

Figure 7:
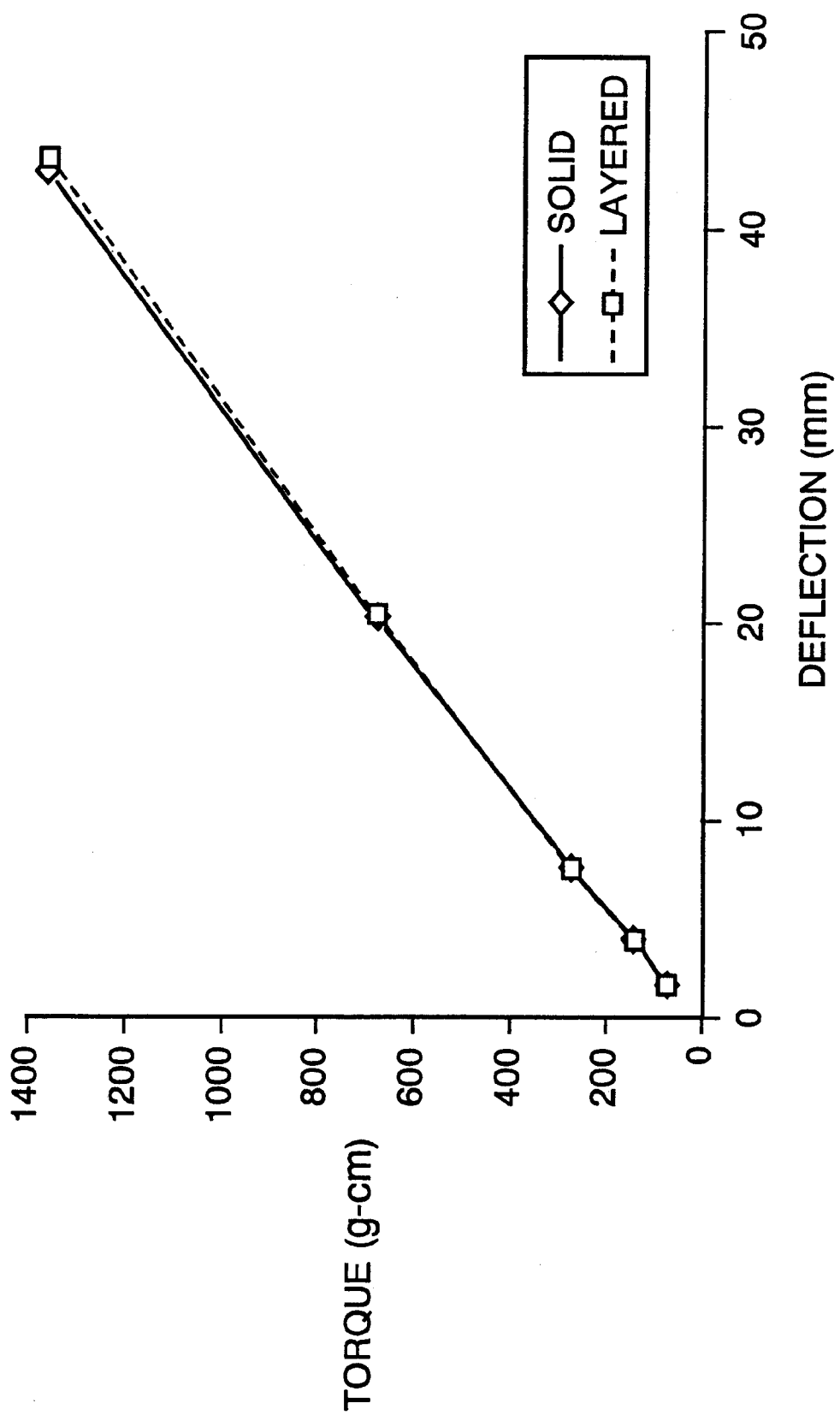
FIG. 7 shows the torque to deflection curve of each dog-bone.

FIG. 7 shows the torque to deflection curve of each dog-bone. It can be realized in this graph that the layered dog-bone is equally stiff in torsion as the solid part.

Figure 8:
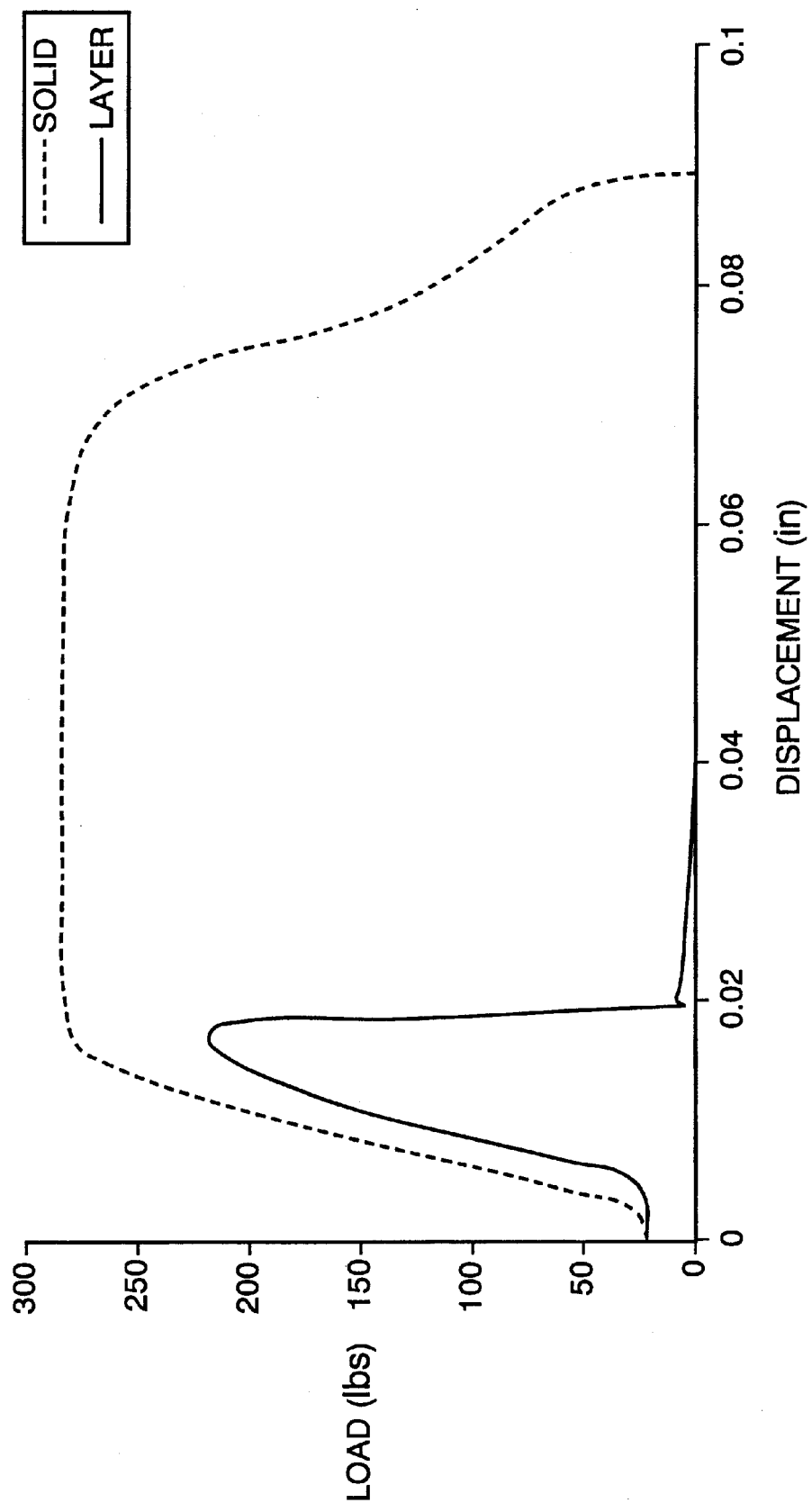
FIG. 8 is a graph of the load versus displace of a comparison of two dog-bone samples.

The final test conducted between the two dog-bone samples was a tensile strength comparison. The tensile strength of the two dog-bone samples was measured using an Instron Universal Testing Machine. The Instron machine measures normal force and deflection as the dog-bones were being tested. FIG. 8 shows the displacement of the dog-bone versus load. The figure shows a larger initial displacement in the layered part due to the initial slipping of the unwelded interior areas in the layered part. As the interior points get closer together, this initial slipping is reduced. In the elastic region, the layered dog-bone has about the same stiffness (Young s modulus of elasticity E) with the solid part.

Parts by Ultrasonic Rapid Prototyping

The particular features and benefits of ultrasonic prototypes, made of multiple material layers, are attractive to several application areas, such as the automobile industry. In the following section, such applications of the ultrasonic prototypes will be examined, both for research and development and in actual production, also in combination with classical manufacturing methods. These prototypes, beyond their standard utilization for visualization of the product geometry, validation and testing of shape characteristics, and development of production molds and dies (rapid tooling), are designed to be used as in-service functional products, with several active and intelligent features.

As explained above, the ultrasonic adhesion method, also referred to as ultrasonic prototyping system, can be used to develop solid metal parts, made of standard foil (steel, aluminum, titanium and alloys), with mechanical properties comparable to those of machined or cast products. Such prototypes can be used as product models for in-service testing, or even as real functional end products. Full-strength product models can be developed quickly and inexpensively on the prototyping machine, without need for casting or molding in a foundry facility. For example, several alternative designs of an engine cylinder and head block, an exhaust manifold or a transmission casing, can be fabricated from aluminum foil directly by the ultrasonic prototyper, without need to develop single-use ceramic dies from the model for investment casting of the aluminum part in the foundry. The solid prototype can be subsequently mounted on an actual engine for in-service tests.

Figure 9A:
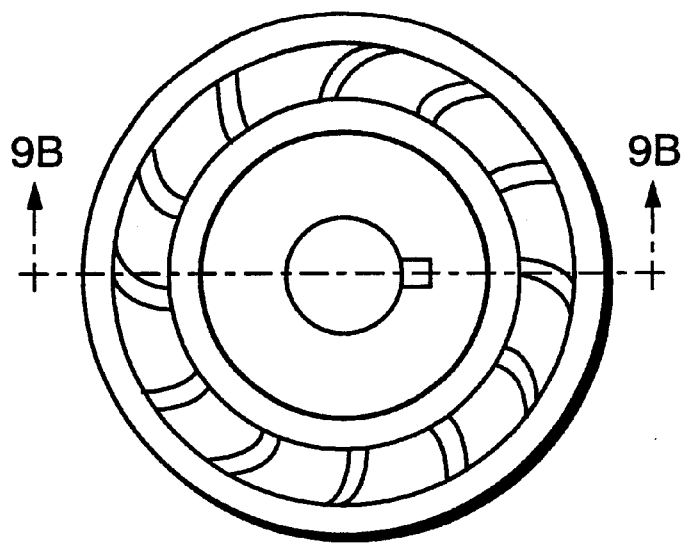
FIGS. 9A and 9B are a top view and a sectional view of a solid bevel helical gear constructed according to the invention.
Figure 9B:
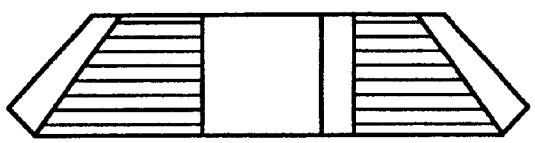

Rapid prototyping of such solid material parts can also provide an economical means for low-volume production of functional products in small lots, or for single copies of replacement parts for old models, for which mass production has been discontinued. For example, replacement parts for various engine, transmission, pump and alternator cast components of discontinued car models can be easily produced without need for retaining their hardware production dies and resorting to casting. Rather, the part geometry software file, saved in a product database, can be downloaded to the RP device for production of single parts upon demand. In the ultrasonic system, such fabrication can be done more efficiently by combining classical machining of solid aluminum blocks by the end-mill tool, with ultrasonic bonding of aluminum foil to implement non-machinable part features, such as internal cavities or inaccessible concave curvatures without re-fixturing the part on the device. FIGS. 9A and 9B illustrate such a layered metal part design.

In addition to forming parts from a single material using multiple layers of planar sheets, the ultrasonic RP technology can simultaneously use foils of different but compatible metals to develop sandwiched multi-metal parts with alternating layers. The combination of multiple materials using the material moving device 42 is explained in further detail below. Such cladding of various metal combinations is useful for protection from oxidation and corrosion. For example, thin pads from multiple metals with properly selected electrochemical potentials and small exposed polarization surfaces, can be made conformal to steel parts of the car body. These can be attached to their inner surface for anodic protection. Also, multi-metal combinations can be used to obtain parts with properly designed thermal properties. For example, thermal expansion-compensated parts and coatings can be produced for engine valves and seats, as well as cylinder and piston jacketing.

Figure 10:
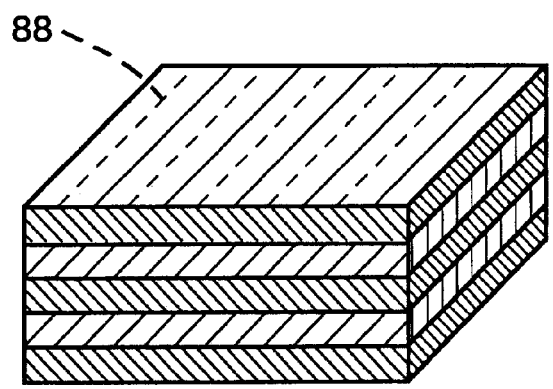
FIG. 10 is a perspective view of a two-metal layer sandwich part with patterning.

Multiple-metal layered products can be developed with various surface sectioning patterns on each layer, to effect specially designed directional properties in different areas. FIG. 10 shows such a two-metal sandwich, in which the two different material layers are sliced with thin parallel sections in two perpendicular directions. The slicing is implemented by the cutting device after the planar layers are welded together. Such a composite material will exhibit anisotropic stiffness and toughness properties in each direction, equivalent to those of the material sliced in that direction. Also, a sandwiched part made of stiff but rather brittle metal layers alternating with a those of a softer but more ductile metal, can combine the elastic stiffness of the mechanically stronger component with the fracture toughness of the more ductile one, after the hard layers are ruptured following an overloading. Such materials can be used, for example, in bumper elements and supports, and in body stiffeners for energy absorption in crash-worthiness design and tests.

Figure 11:
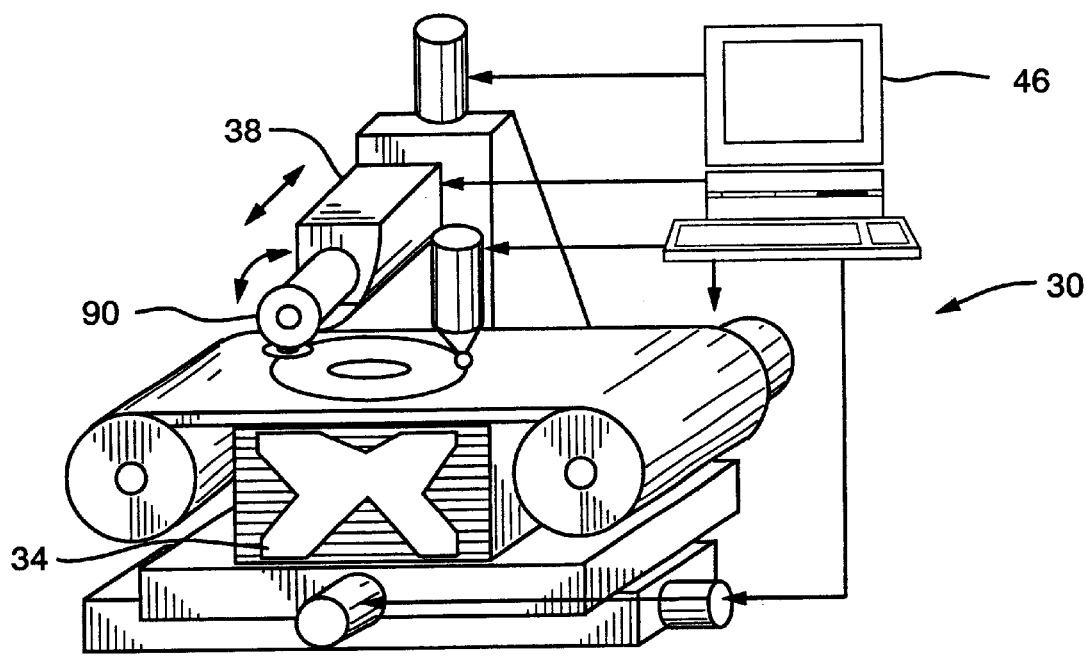
FIG. 11 is a perspective view of a ultrasonic adhesion apparatus with seam ultrasonic welding.

FIGS. 11 and 12 show an ultrasonic adhesion apparatus 30 with an ultrasonic weld device 38 with a seam wheel 90. The seam wheel 90 is used in producing seam welds 88 as seen in FIG. 10.

Multiple Material Moving Device Embodiment

Figure 13:
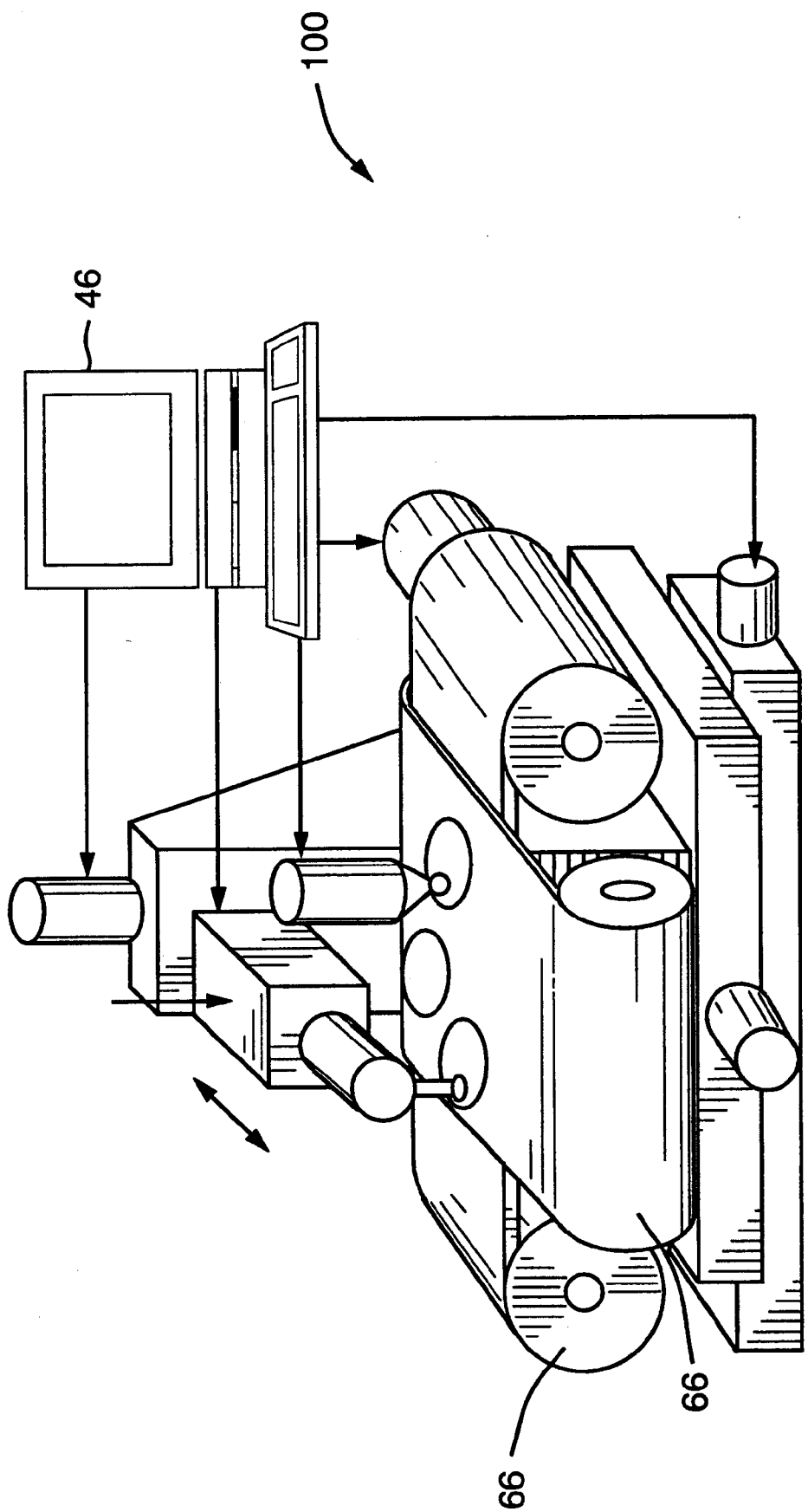
FIG. 13 is a multi-material ultrasonic adhesion apparatus.

Referring to FIG. 13, a multi-material ultrasonic adhesion apparatus (MUSA) 100 is seen. The MUSA is similar to the ultrasonic adhesion apparatus 30 shown in FIG. 1 and has a table 36 on which the three-dimensional part or layered prototype 34 is built, an ultrasonic welder device 38, a cutting device 40, a material moving device 42, a moving mechanism 44 and a control unit 46. The difference between the two is that the material moving device 42 has at least two automatic feeders, supply/take-up feed systems 66. Each feeder supplies a different material.

The feeders 66 are arranged perpendicular or at an angle to each other. After a layer of one material is added to the three-dimensional part, and another material is to be deposited next. The feeder of the material not to be used is retracted using the supply/take-up drums, so that a large blanked opening in the unused material sheet comes over the part region in which welding or cutting of the next material is to be performed. That opening area in the previous material was created previously by the cutter, during blanking of the useful section of this material that has been attached to the three-dimensional part. This opening allows for access of the ultrasonic welding sonotrode tip or the cutter device tip to the full section of the next material, which is cross-fed on top of the three-dimensional part by its feeder, in order to serve as the next planar sheet to be deposited. If another material foil lies between the material to be used and the part, that foil is similarly rewound to a blanked opening, to ensure contact of the material to be used on the part.

Figure 14:
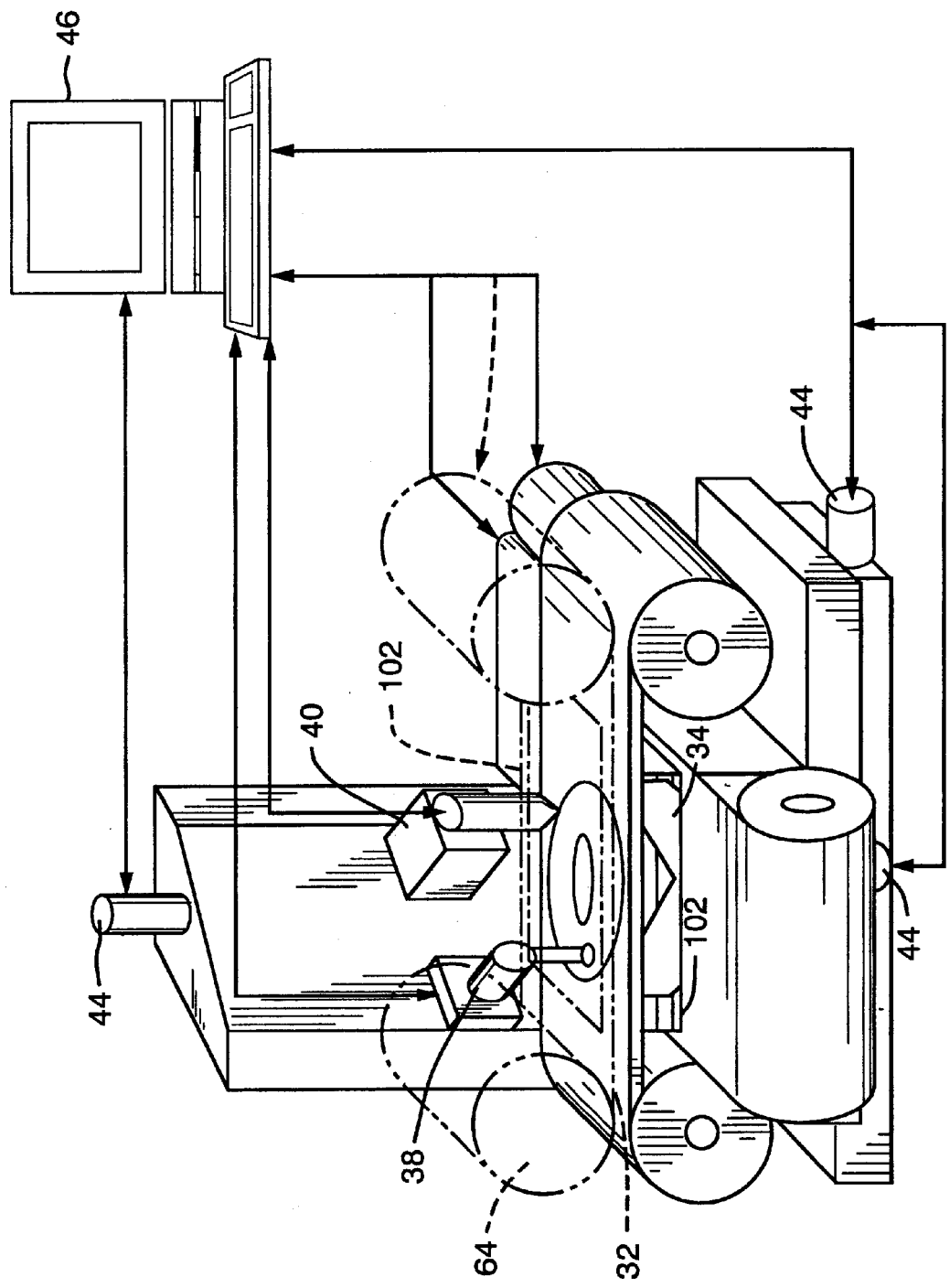
FIG. 14 is an alternative multi-material ultrasonic adhesion apparatus. An additional supply/take-up feed system is shown in phantom.

FIG. 14 shows an alternative multi-material adhesion apparatus 100. One of the supply/take-up feeder systems has retracted backwards to a large blank opening 102 which was aligned with the part 34 and lowered, such that planar sheet 32 of the desired material is in contact with the top of the part 34. A third planar sheet 32 on a third supply/take-up feeder system 64 is shown in phantom. A large blank opening 102 is aligned with the part 34 so that the ultrasonic welder device 38 and cutting device 40 can extend through the opening 102.

In constructing parts from multiple sandwiched material layers, which may not be compatible for ultrasonic welding, it may be necessary to weld layers that are not adjacent. FIG. 15B illustrates the case of two alternating layers of incompatible materials (e.g., plastic base with metal matrix). These can be joined to generate a composite prototype, by bonding every other layer (i.e., of the same material) through blanked openings in the intermediate layer of the other material. The scrap portion of this interposed material that corresponds to the opening is ultrasonically attached to an upcoming section of the same foil, in order to be recycled to the takeup drum, before the next material is positioned to be ultrasonically welded to the layer below, as seen in FIG. 16. This removal of the scrap section is similar to that of the rejected portions in hollow regions of three-dimensional parts made from a single material.

Figure 17:
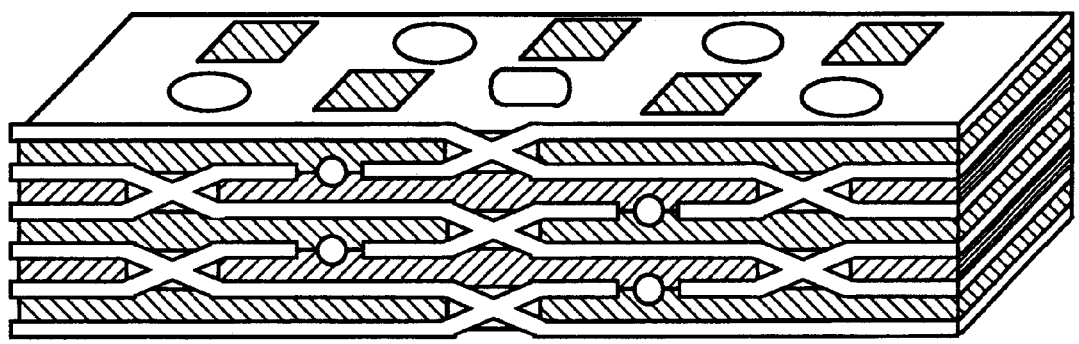
FIG. 17 is a perspective view of a metal-plastic sandwich part.

Using the ultrasonic RP process, alternating layers of incompatible materials, such as plastic and metal foils as seen in FIG. 17, can still be mechanically joined to generate a composite part, by bonding every other layer (i.e. of the same material) together, through blanked openings in the intermediate layer. Such plastic-clad metal sheet coatings ensure oxidation and corrosion protection, e.g. of environmentally exposed steel components. Also, the insulating plastic layers limit thermal conduction in the normal direction, while still maintaining the in-plane strength of metal layers. These sandwich materials can thus be used for thermal insulation in engine and exhaust supports, as well as car body and suspension components. Another reason for their use in such components is their passive noise and vibration damping properties in their normal direction (due to the plastic layer internal friction), combined to the metal layer stiffness in their plane directions. Their compliance in the thickness direction makes them useful for flange coatings and inserts in the engine and piping components.

Figure 18:
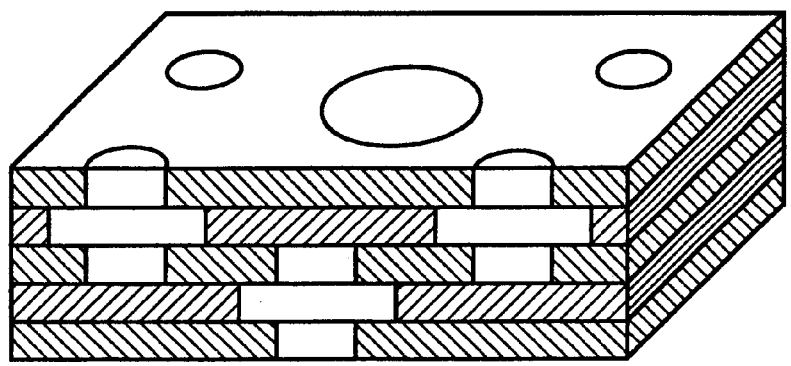
FIG. 18 is a perspective view of a part with plastic filler.

FIG. 18 shows a layered metal part with structured internal voids or plastic filler lumps. Besides material economy and lighter weight, such void/filler structures show excellent noise and vibration damping, making them useful for engine and exhaust supports, and for suspension, brake and clutch components as above. Note that layered fabrication of full-strength metal parts enables implementation of fully-enclosed, macroscopic internal cavities in the product, possibly containing another material. Such hollow single-part designs are found, e.g. in engine valves containing a low-melting metal filler to increase their thermal capacity with its latent heat of fusion.

Figure 19A:
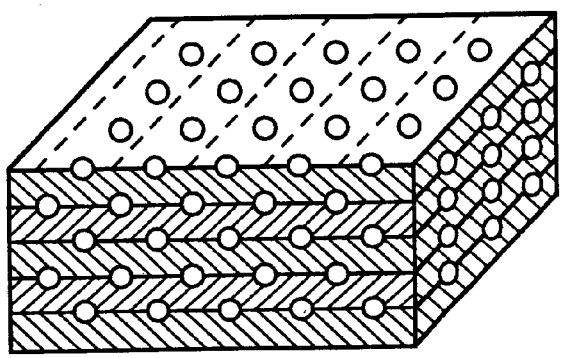
FIGS. 19A and 19B are perspective views of parts with particle and fiber reinforcement.
Figure 19B:
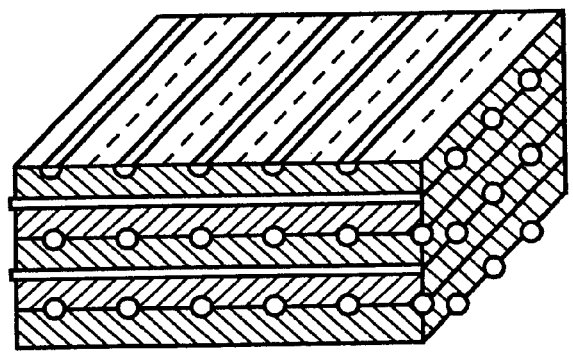

The layered fabrication of parts allows for incorporating reinforcement particles or fibers between successive foil layers to produce metal-matrix or polymer-matrix composite parts or coatings, such as seen in FIGS. 19A and 19B. The fibers can be oriented in preferential directions or patterns to yield directional mechanical strengthening of the material. For example, graphite, alumina or silicon carbide fibers can be interwoven to aluminum foil, and graphite or Kevlar fibers can be combined to thermoplastic materials to produce composite prototypes. Such materials have a high strength to weight ratio and good vibration damping properties. Thus they are of particular interest for parts such as wheels and stiffeners for local reinforcement of the car body. They are also suitable for thin, hard composite coatings on the surface of parts produced by classical techniques, such as high-performance brake disks and engine liner jackets.

In addition to creating a three-dimensional part of multiple materials as described above, other devices, such as nitinol wire, optical fiber, and sensors can be added to the part. These devices can be added by hand or robotically between layers.

Figure 20:
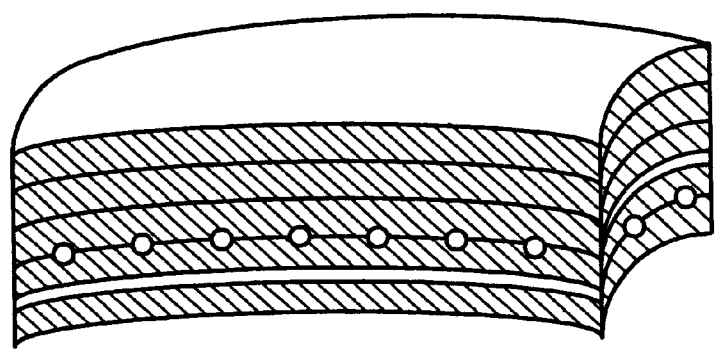
FIG. 20 is a perspective view of an active deformable surface part.

Actively deforming layers and parts can be implemented by introducing mechanical actuators, such as shape memory alloys (SMA, e.g. Nitinol wires), bimetallics and piezoelectric sheets (e.g. PVF2) between the prototype layers. FIG. 20 shows such a flexible multilayer sheet with embedded Nitinol wires, which shrink upon their heating by a small electric current through the wire, yielding large contraction forces and deformations. This arrangement results in controlled off-plane bending curvatures, as well as in-plane distortions of the sheet. Besides active compensation for thermal expansion or mechanical loading, such structures can be used as actively deformable surfaces. For example, ice breaker pads can be designed and installed under the car body surface to break accumulated ice layers (or dry mud under the wheel chambers) by a minimal deformation of the surface curvature. Additional applications can be found in airfoil surfaces, active dies, etc.

Another important use of such deformable surfaces and parts is in active damping of noise and vibration. These can be used when a part of the car structure or its body surface is detected to resonate (through an embedded mechanical sensor such as the strain gauges due to an excitation from the engine, the suspension or an external noise. A deformable stiffener attached to that element can then be actuated to change its elastic characteristics, and thus move its resonance band away from the excitation frequency, resulting in damping of its vibration. Active dampers with piezoelectric components can also be vibrated at the resonance frequency and a 180° phase shift to oppose and damp the excitation vibration, and thus reduce the noise level.

Similar to mechanical actuators, heating elements such as foil resistors can be embedded between layers of a prototype, to yield actively heated parts or surface coatings. For example, layered preheater coatings or elements can be designed for the door keylocks, steering wheel and driver controls, the engine block, etc.

Figure 21:
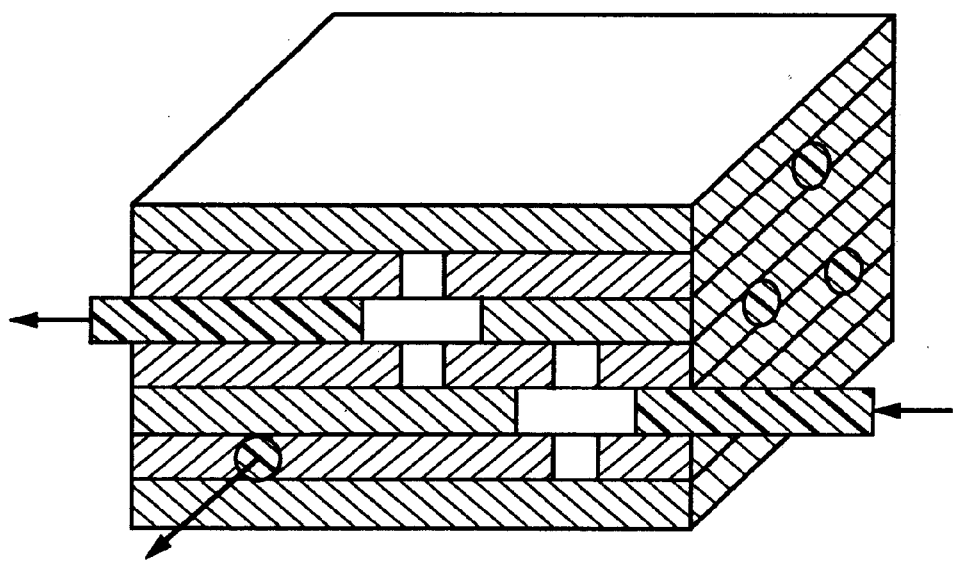
FIG. 21 is a perspective view of a plastic part with embedded fiber optics.

FIG. 21 shows a plastic foil coating with thin optical fibers arranged between layers to transmit light from light emitting diodes (LED). This arrangement can be used to produce very thin, custom-designed lighting pad surfaces or small displays for signals and messages. Note also that fiber optics can be used for illumination or thermal sensing, i.e. by transmitting the infrared radiation emission from an internal point to an external IR photodiode sensor element. Thus, for Research and development thermal analysis, e.g. of an engine block design, an optical fiber network properly embedded in a functional aluminum engine prototype can be used in-service to measure the full temperature distribution in the block.

Figure 22:
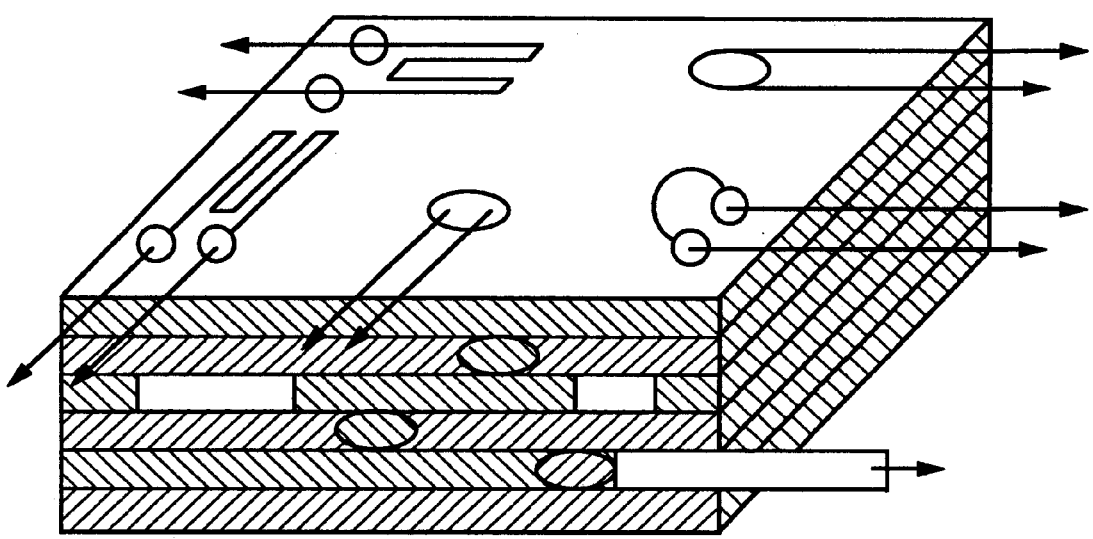
FIG. 22 is a perspective view of a layered part with embedded sensors.

The ultrasonic RP method as described above allows for embedding of thin sensor elements between the prototype layers, to measure the in-service developed mechanical stress or strain and thermal variables at important internal locations, such as seen in FIG. 22. Such sensors include thin film thermocouples and thermistors for temperatures; resistive foil strain gauges and rosettes for stress measurements in various directions; inductive vibration/acceleration elements; resistive/capacitive moisture sensors, etc. Certain piezo-thermoelectric materials, such as polyvinyl-fluoride 2 (PVF2) sheet layers, exhibit dermic behavior, i.e. they can be used to sense both mechanical compression and heat flux by developing capacitively a local electric charge. Embedded thermocouples may be used, for example, for temperature alarms at the engine jackets or the brake disks. Embedded strain gauges can serve for active damping of vibrations and noise in the cabin, as already explained; for collision detection alarms in bumpers and other body components; for tire air pressure loss alarms in wheels; for slack and imminent failure detection of the timing belt in the gear teeth or jockey pulley, etc.

Besides production applications, similar embedded sensors are valuable in research and development analysis of functional part prototypes in service. Thus, models of the cylinder and head block of the engine can be fabricated from aluminum foil, with encapsulated thermocouples between the layers, to assess and optimize the temperature distribution for various designs of the cooling water passages in actual operation tests. Similar thermal studies with sensor measurements can be performed for various morphologies of exhaust manifold prototypes mounted on an actual engine. The loading stress distribution in the casing of transmission units can be studied in action using an aluminum prototype with embedded strain gauges between the foil layers, etc.

Most embedded sensors such as thermocouples and strain gauges produce weak output signals, which need to be conditioned locally before their communication in order to avoid noise corruption. This requires amplifier, noise filter, analog/digital converter, encoder and transmitter circuits. Also, for energy-efficient operation of actuators such as resistance heaters and SMA wires, their power must be relayed and controlled locally. This can be done by receiver, decoder, digital/analog converter and relay circuitry. Moreover, in feedback control applications such as active vibration and noise damping it is advantageous to have local information processing rather than bidirectional transmission to a central processor unit. This closed-loop control is performed by a microprocessor, a memory chip and a communication port for programming.

Figure 23:
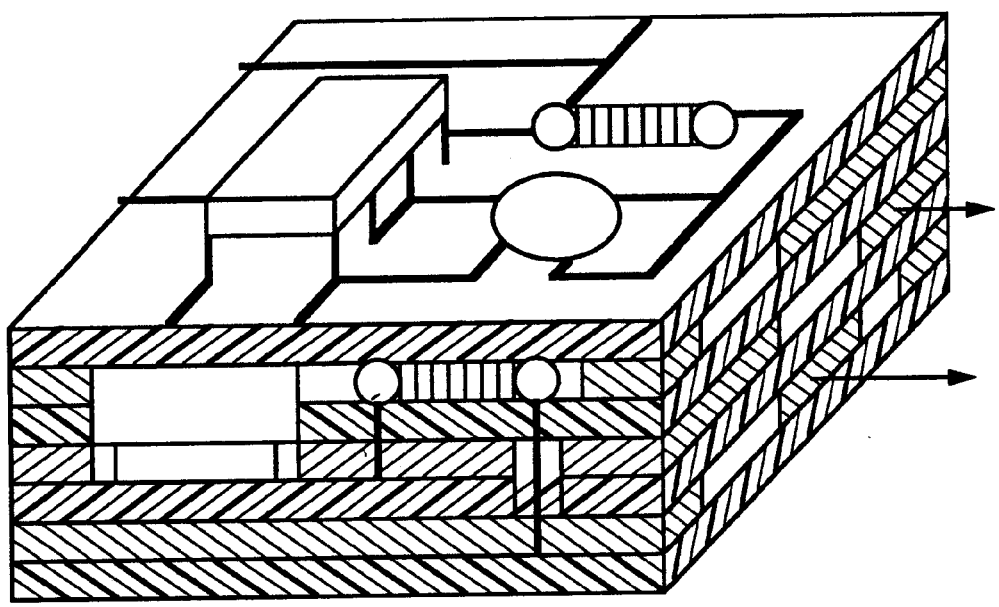
FIG. 23 is a perspective view of a multi-level printed circuit board with electronics.

FIG. 23 illustrates how such local intelligence can be implemented by standard electronic components (IC's, resistors, capacitors, relays, etc.) embedded in the prototype, with alternating conductor-insulator (metal-plastic) layers. Custom-designed printed-circuit board (PCB) patterns can be easily realized by the RP techniques on the metal layers, with connection openings provided in the plastic layers. This results in a compact and efficient multi-level PCB structure, with the encapsulated components sealed and protected from the harsh automobile environment.

Figure 24:
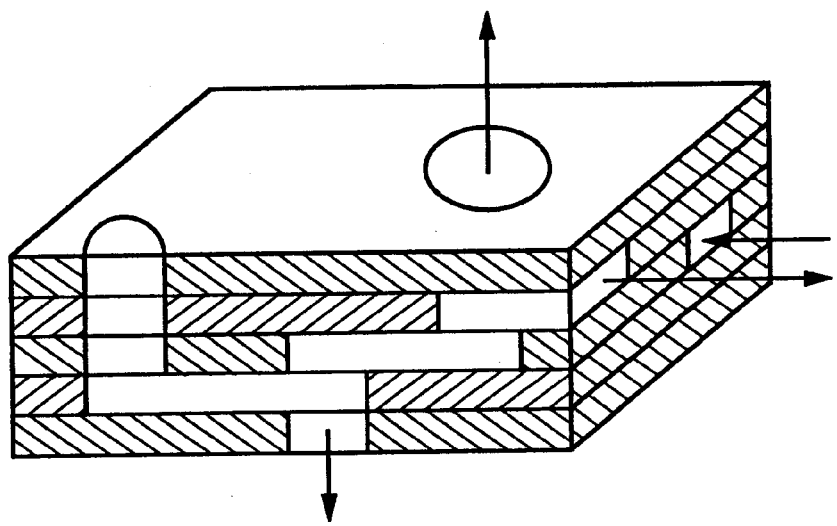
FIG. 24 is a perspective view of a part with passive multi-layer channeling.

Besides electronic processing, fluidic intelligence can be imparted to the layered parts by proper design of the three-dimensional hydraulic network structure. FIG. 24 shows such a passive multi-layer channeling example, where the flow is driven by external pressure or temperature differences. The internal channels can be designed conformal to the external part surface, and their network can be more or less vascular in various part regions depending on their irrigation needs. Such internal channeling greatly enhances the heat and/or mass transfer in heat exchanger, evaporator, condenser and diffuser parts. Channeled parts and coatings are applicable to engine blocks, heads and pistons, radiators, air conditioning condensers, exhaust coolers and emission sensor/control units.

Figure 25:
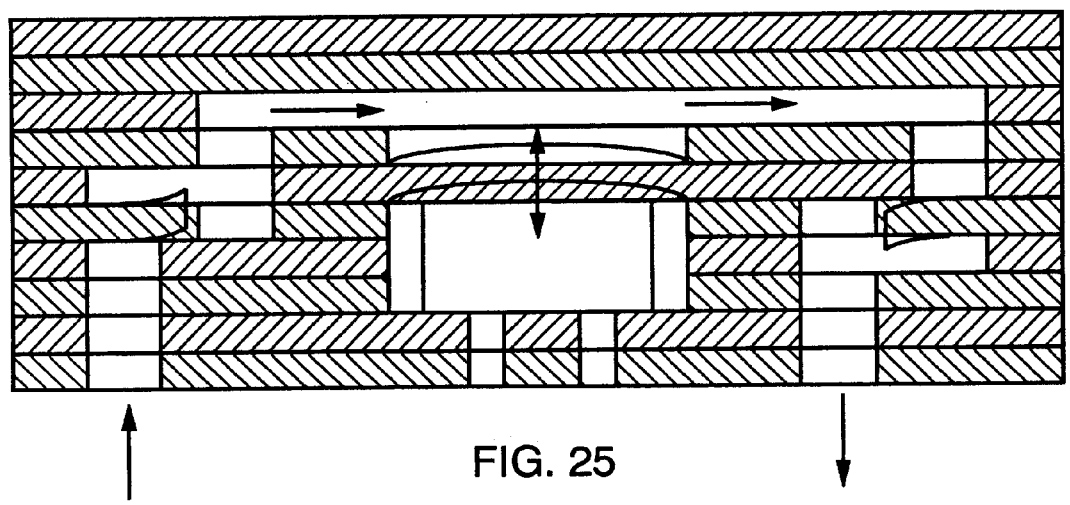
FIG. 25 is a sectional view of a part with active micro-hydraulic pump layout.

FIG. 25 also illustrates the implementation of an active compressor unit in a layered part, including a piezoelectric-powered pumping diaphragm and chamber, two valves and channeling. Such small, low-power components can be used for flow compensation, distribution and regulation units in the fuel injector system; in cylinder, camshaft, crankshaft and gearing/bearing lubricators; in automatic transmission, power steering and braking systems. In addition, besides flow and heating/cooling networks, such compressors can be used for mechanical actuators, e.g. miniature rotary turbines, cylinder/piston hydraulic motors, or active deformable part surfaces. Applications again include active vibration dampers, ice removal pads, smart bumpers with compression chambers for automatic dent removal, automated tire inflators and air pressure regulators in the wheels, etc.

Figure 27:
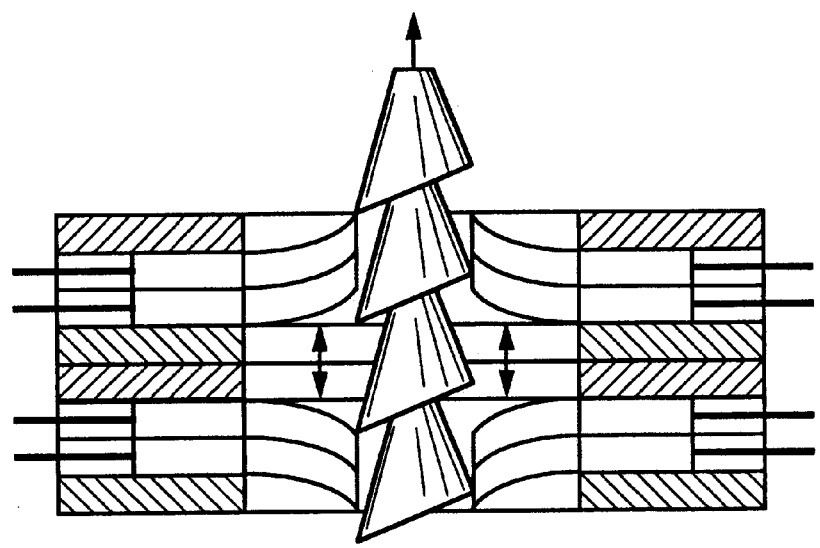
FIG. 27 is a sectional view of a part with bimetallic linear motor.
Figure 26A:
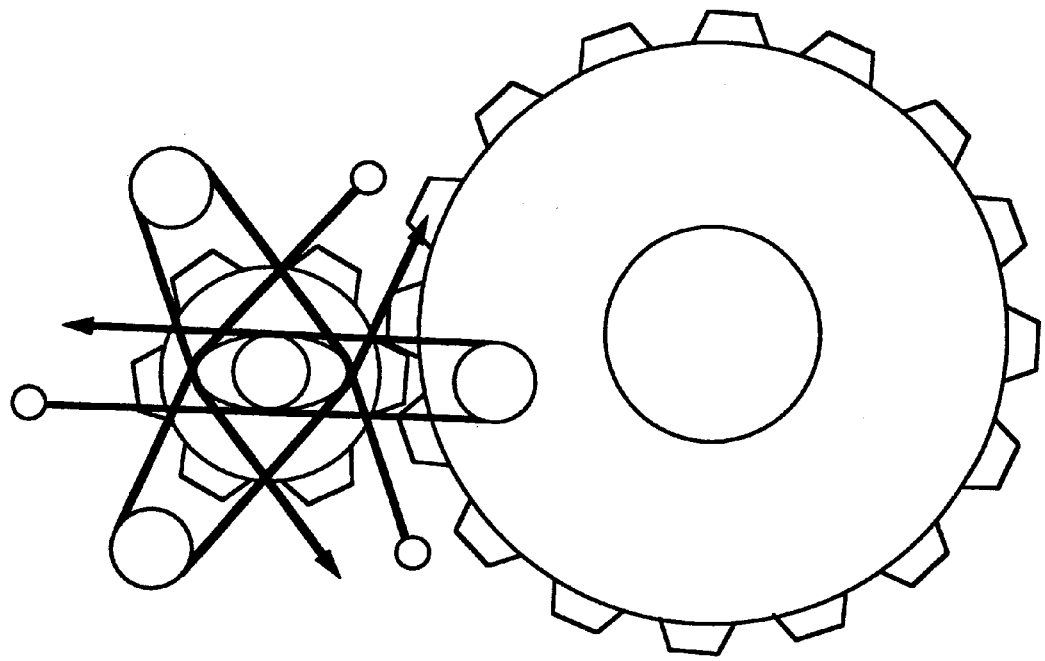
FIG. 26A is a sectional view of a part with nitinol wire micromotor and gear transmission.
Figure 26B:
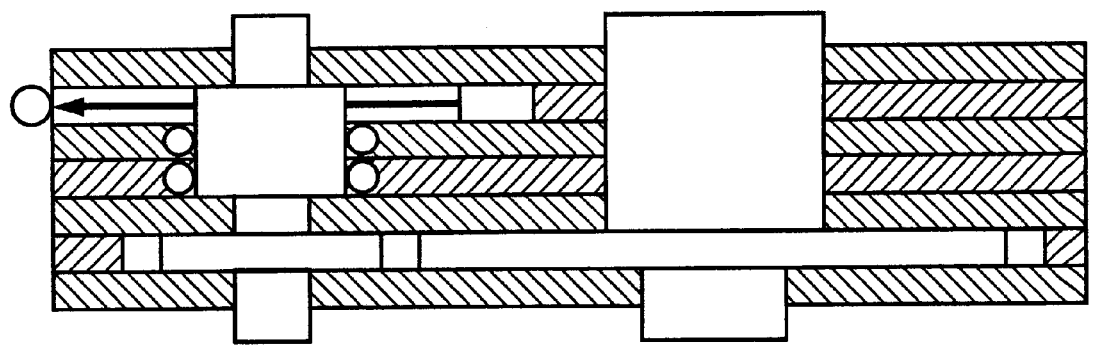
FIG. 26B is a top view of the part of FIG. 26A.

Miniature functional mechanisms with multiple links and joints, and composed of various foil materials, can be constructed by layered fabrication on the ultrasonic RP systems. These consist of diverse elements such as levers, pulleys, gears, etc. FIGS. 26A and 26B illustrate the construction of such a micromotor with geared transmission. The motor consists of a plastic elliptic rotor, surrounded by three Nitinol wire loops. Periodic sequential contraction of each loop wire (with the other loops relaxed) aligns the rotor ellipse to that loop direction, thus resulting in an incremental 60° rotation. Properly sequenced activation of the Nitinol wires is obtained by relay electronics. The rotation is transformed by a single-stage 1:2 gear reduction. FIG. 27 shows an axial motor design, with a screw ram translated by the reciprocating bending motion of bimetallic elements.

Intelligent micro-mechanisms and mechatronics arrangements are applicable, besides active damping components, to dashboard instruments and controls, alarm and passenger restraint (airbag) sensors, etc. Similar parts can also be automatically custom-made and tested in engine control, automatic transmission, power braking and steering, active suspension, driver controls, etc. Their small size and compact layered design is also attractive to other fields such as watch making, tactile sensor arrays, microrobotics, etc. They provide an economic alternative to micro-electromechanical structures (MEMS), since their fabrication does not involve the cost of silicon processing techniques and clean room requirements. At the same time they provide for much greater robustness, power, design and material selection flexibility than MEMS.

As shown above, ultrasonic welding is an ideal bonding method when dissimilar material parts need to be permanently bonded without being subject to the effects of the heat. Since the heat is small and no fusion takes place, materials of different melting points can be welded. Below are some of the advantages of ultrasonic welding:

There is no coarse grain formation and thus no embrittlement of the parts.

Mechanical stability of resistance to corrosion remain unchanged.

The low temperature prevents alteration of the material structure and properties.

The low temperature protects against thermal distortions and warpage of the laminations.

Excellent electric and thermal conductivity is achieved for metals.

Addition of material is not required.

Special conditions such as a vacuum, cooling or protective gas or air conditioning are not required.

Little power is consumed compared to other welding processes.

Produces no radiation, electromagnetic fields and toxic fumes.

Reduces safety requirements for high voltage, temperature, etc.

Most metals and their alloys are well suited for ultrasonic welding. Materials such as copper, aluminum, brass are bonded very well to each other. Materials such as lead, tin, and zinc cannot be welded due to their high lubricity. Plastics are ultrasonically welded, with vertical scrubbing instead of horizontal scrubbing as with metals. Plastics do not allow diffusion to take place, so the bonds must come from fusing the plastic parts together. The combinations of metals that can be welded ultrasonically are well known in the art and can be found in standard ultrasonic welding books such as The Welding Handbook of the American Welding Society.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of producing a complete part comprising the steps of:

providing a pair of planar sheets of material;

introducing a pressure mask for applying pressure to the sheets;

ultrasonically welding the sheets of material together;

cutting the sheet to define a planar portion of the shape of a partial part of the complete part and to form excess sheet material;

placing an additional planar sheet of material on the partial part;

ultrasonically welding the additional sheet to the partial part;

cutting the additional sheet to define a portion of the shape of the partial part of the complete part; and repeating the placing, welding, and cutting until the complete part is complete.

2. The method of producing a part of claim 1 further comprising the step of controlling the welding and the cutting of the sheets with a control unit.

3. The method of producing a part of claim 2 wherein the step of placing a sheet on the partial part includes the steps of moving an elongated sheet of material over the partial part by using a supply drum and a take-up drum controlled by the control unit and moving the new portion of the sheet in contact with the partial part.

4. The method of producing a part of claim 2 further comprising the steps of introducing sheets of different materials.

5. The method of producing a part of claim 4 further comprising the step of introducing a non sheet component between layers of sheet material of the part.

6. The method of producing a part of claim 2 wherein the welding of the sheets of material is in specific pattern.

7. The method of producing a part of claim 2 further comprising the step of retaining at least a portion of the excess sheet material around the part until the part is complete.

8. The method of producing a part of claim 7 further comprising the step of cutting the excess sheet material in a cross hatch pattern.

9. The method of producing a part of claim 2 further comprising the steps of:

bolting a first of a pair of planar sheets to a platform; and welding a second of a pair of planar sheets to the first of the pair of planar sheets.

10. The method of producing a part of claim 2 further comprising the steps of:

cutting the planar sheet to define a sheet segment which defines a void in the part;

placing an additional planar sheet in contact with the sheet segment;

welding the additional sheet to the sheet segment using the ultrasonic welder; and removing the additional sheet and the sheet segment to create the void.

11. The method of producing a part of claim 2 further comprising the steps of:

placing a planar sheet in contact with the partial part;

welding the planar sheet to the partial part using the ultrasonic welder;

placing an additional planar sheet in contact with the partial part;

welding the additional sheet to the sheet segment using the ultrasonic welder;

cutting the planar sheet and the additional planar sheet to define a sheet segment which defines a void in the part; and removing the additional sheet and the sheet segment to create the void.

12. The method of producing a part of claim 2 wherein all the planar sheets are compatible metal material layers.

13. A method of producing a part comprising the steps of:

providing a pair of planar sheets of a first material;

ultrasonically welding the sheets of the first material together by an ultrasonic welder using a control unit to control the positioning of the welder and the sheets;

cutting the sheet using a cutting device to define the shape of the partial part using the control unit to the position of the cutting device, the partial part and the sheet;

placing an additional planar sheet of material on the partial part using a sheet feeder;

ultrasonically welding the additional sheet to the partial part;

cutting the additional sheet to define the shape of the partial part;

introducing layers of a planar sheets of a second material which are incompatible for ultrasonic welding with the first material and bonding the respective material with compatible materials through voids cut in the incompatible material; and repeating the placing of the materials, welding, and cutting until the complete part is complete.

14. The method of producing a part of claim 13 further comprising introducing a pressure mask for applying pressure to the top layer as the layer is ultrasonic welded to the part.

15. The method of producing a part of claim 13 further comprising the step of introducing a component between layers of material of the part.

16. The method of producing a part of claim 15 wherein the component is a thermal actuator.

17. The method of producing a part of claim 15 wherein the component is a optical component.

18. The method of producing a part of claim 15 wherein the component is a sensor device.

19. The method of producing a part of claim 15 wherein the component is a plurality of electronic elements.

20. The method of producing a part of claim 15 wherein the component is a mechanical actuator for creating a actively deformable part.

21. The method of producing a part of claim 15 wherein the component is sensitive to manufacturing temperatures in excess of 50 percent of the material melting temperature of the sheet material.

22. The method of producing a part of claim 13 further comprising the steps of:

inputting into the control unit three-dimensional data on the part; and converting the three-dimensional data into two-dimensional contours.

23. The method of producing a part of claim 22 further comprising the steps of:

cutting the planar sheet to define a sheet segment which defines a void in the part;

placing an additional planar sheet in contact with the sheet segment;

welding the additional sheet to the sheet segment using the ultrasonic welder; and removing the additional sheet and the sheet segment to create the void.

24. The method of producing a part of claim 23 wherein the welding of adjacent layers is staggered.

* * * * *